(12) United States Patent
Shibahara et al.

(10) Patent No.: US 7,518,700 B2
(45) Date of Patent: Apr. 14, 2009

(54) DISPLAY ELEMENT AND DISPLAY DEVICE

(75) Inventors: Seiji Shibahara, Tenri (JP); Iichiro Inoue, Tenri (JP); Koichi Miyachi, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 557 days.

(21) Appl. No.: 11/114,243

(22) Filed: Apr. 26, 2005

(65) Prior Publication Data

US 2005/0237472 A1 Oct. 27, 2005

(30) Foreign Application Priority Data

Apr. 27, 2004 (JP) ............................. 2004-131972
Apr. 19, 2005 (JP) ............................. 2005-121713

(51) Int. Cl.
*C09K 19/02* (2006.01)
(52) U.S. Cl. ..................... 349/167; 349/141; 349/129; 349/130; 349/132; 349/145
(58) Field of Classification Search ................ 349/141, 349/167, 129, 178, 139, 130, 146, 145, 123, 349/132, 126, 96, 171, 175
See application file for complete search history.

(56) References Cited

U.S. PATENT DOCUMENTS

| | | | |
|---|---|---|---|
| 5,888,421 A | 3/1999 | Toyne et al. | |
| 6,266,109 B1 | 7/2001 | Yamaguchi et al. | |
| 6,346,932 B1 | 2/2002 | Maeda | |
| 6,645,576 B2 * | 11/2003 | Iwakabe et al. | 428/1.1 |
| 7,098,980 B2 * | 8/2006 | Hirota | 349/141 |
| 2001/0024184 A1 | 9/2001 | Maeda | |
| 2001/0028424 A1 | 10/2001 | Maeda | |
| 2003/0081163 A1 | 5/2003 | Suzuki et al. | |

(Continued)

FOREIGN PATENT DOCUMENTS

JP 5-507725 A 11/1993

(Continued)

OTHER PUBLICATIONS

S. Matsumoto et al., "Fine droplets of liquid crystals in a transparent polymer and their response to an electric field", Appl. Phys. Letter, No. 69, pp. 1044-1046, 1996.

(Continued)

*Primary Examiner*—Thoi V Duong
(74) *Attorney, Agent, or Firm*—Nixon & Vanderhye, P.C.

(57) ABSTRACT

The subject invention provides a display element which achieves reduction in driving voltage. The display element according to the present invention includes substrates 1 and 2, at least one of which is transparent, and a medium layer 3 held between the substrates 1 and 2, the display element further including on the substrate 1 electrodes 4 and 5 for generating an electric field in a direction substantially parallel to the substrates so as to apply the electric field to the medium layer 3 to cause optical modulation of the medium; and an alignment film 6 which is provided on the surface of the substrate 2. With this arrangement, the voltage level is not decreased because of the alignment film 6, and the driving voltage of the display element does not need to be increased, thereby ensuring reduction of driving voltage.

33 Claims, 18 Drawing Sheets

U.S. PATENT DOCUMENTS

2003/0133068 A1 7/2003 Suzuki et al.
2005/0264743 A1 12/2005 Suzuki et al.

FOREIGN PATENT DOCUMENTS

| JP | 10-307295 A | 11/1998 |
| JP | 11-183937 | 7/1999 |
| JP | 2001-149363 | 6/2001 |
| JP | 2001-249363 | 9/2001 |
| JP | 2004-4754 A | 1/2004 |
| WO | 92/16519 A2 | 10/1992 |

OTHER PUBLICATIONS

K. Saito, et al., "Thermodynamics of a unique thermo-tropic liquid crystal having optical isotropy", Ekisho, 2001, vol. 5, No. 1, pp. 20-27.

J. Yamamoto; "Liquid crystal micro emulsion", Ekisho, 2000, vol. 4, No. 3, pp. 248-254.

Shiraishi et al., "Palladium Nanoparticles Covered with Liquid-Crystalline Molecules—Preparation and Electro-Optic Properties of Liquid-Crystal Displays Doped with Palladium Nanoparticles", Kobunshi Ronbunshu, vol. 59, No. 12, pp. 753-759, Dec. 2002.

D. Demus et al., "Handbook of Liquid Crystals", vol. 2B, pp. 887-900, 1998 Wiley-VCH.

J. Yamamoto, "First lecture of liquid crystal science experiment: Identification of liquid crystal phase", Ekisho, 2002, vol. 6, No. 1, pp. 72-83.

E. Grelet et al., Structural Investigations on Smectic Blue Phases, Physical Review Letters, Vo. 86, No. 17, pp. 3791-3794, Apr. 23, 2001, The American Physical Society.

M. Yoneya, "Examining nano-structured liquid crystal phase by molecule simulator", Ekisho, 2003, vol. 7, No. 3, pp. 238-245.

R. Yamamoto et al., "Organic electro-optic material", National Technical Report, Dec. 1976, vol. 22, No. 6, pp. 826-834.

N. Mizoshita et al., "Fast and High-Contrast Electro-optical Switching of Liquid-Crystalline Physical Gels: Formation of Oriented Microphase-Separated Structures", Advanced Functional Material 2003, Vo. 3, No. 4, pp. 313-317, Wiley-VCH Verlag GmbH & Co., KGaA, Weinheim.

H. Kikuchi, et al., Polymer-stabilized liquid crystal blue phases, Nature Materials, vol. 1, Sep. 2, 2002, pp. 64-68, [online], searched by Internet on Jul. 10, 2003.

M. Nakata et al., "Blue phases induced by doping chiral nematic liquid crystals with nonchiral molecules", The American Physical Society, Oct. 29, 2003, Physical Review E, vol. 68, No. 4, pp. 041710-1-04701-6.

* cited by examiner

GENERAL VIEW OF AGGLOMERATIONS | PACKING PARAMETER | SPATIAL PACKING AND PHASES

MICELLE  <1/3

(a) SPHERICAL MICELLE (b) STRING-LIKE/ELLIPTICAL MICELLE

ROD-LIKE MICELLE  <1/2

(c) MIDDLE (d) CUBIC (e) VESICLE (f) SPONGE

BILAYER MEMBRANE  ~1

(g) LAMELLAR(Lα)

(h) LAMELLAR(Lβ)

(i) LAMELLAR(Pα)

(j) CUBIC

REVERSE MICELLE  >1

(k) REVERSE MICELLE (l) REVERSE MICELLE (ORDERLY PHASE)

DISPLAY ELEMENT AND DISPLAY DEVICE

This Nonprovisional application claims priority under 35 U.S.C. § 119(a) on Patent Application No. 2004/131972 filed in Japan on Apr. 27, 2004, and No. 2005/121713 filed in Japan on Apr. 19, 2005, the entire contents of which are hereby incorporated by reference.

FIELD OF THE INVENTION

The present invention relates to a display device, particular to a display element and a display device with high-speed response and wide viewing angle.

BACKGROUND

A liquid crystal display element has advantages over other display element in terms of thinness, lightness in weight, and low power consumption. With these advantages, the liquid crystal display element is widely used for image display devices such as a television or a video, a monitor, OA (Office Automation) equipments such as a word processor, and a personal computer.

There are conventionally well-known liquid crystal display modes for the liquid crystal display element, such as the TN (Twisted Nematic) mode using Nematic liquid crystal, the display mode using FLC (Ferroelectric Liquid Crystal) or AFLC (Anti-Ferroelectric liquid crystal), or the polymer dispersed liquid crystal display mode.

Among the liquid crystal display modes, for example, the TN mode liquid crystal display element has come into practical use. However, the TN mode liquid crystal display element has some drawbacks such as slow response, a narrow viewing angle etc. Those disadvantages are large hindrances for the TN mode to take over CRT (Cathode Ray Tube).

The mode using the FLC or AFLC allows high-speed response and wide viewing angle, but is inadequate in terms of shock resistance or temperature characteristics. Such a defect has kept the FLC or AFLC display device from wide and practical application.

The polymer dispersed liquid crystal display mode uses light scattering, and does not need a polarizer, while allowing high-luminance display. However, the polymer dispersed liquid crystal display mode has a problem in its response property upon image display. Therefore, the polymer dispersed liquid crystal display mode has few advantages over the TN mode.

In each of those liquid crystal display elements, liquid crystal molecules are aligned in a certain direction, and the viewing angle depends on an angle with respect to the liquid crystal molecules. That is, in those display modes, there is restriction in the viewing angle. Further, each of the display modes uses rotation of the liquid crystal molecules caused by electric field application, wherein the liquid crystal molecules rotate together maintaining the alignment, thus a response speed is slow. In the meantime, the mode using the FLC or AFLC is superior in response speed and viewing angle, but the mode has a problem of irreversible alignment breakdown due to external force.

Apart from the display elements using the molecule rotation caused by application of the electric field, there has been suggested a liquid crystal display element using a material whose optical isotropy changes in response to electric field application, particularly a material causing orientational polarization due to electric optical effect, or electronic polarization.

The term "electro-optic effect" indicates such a phenomenon that reflective index of a substance varies according to an external electric field, and there are two types in the electro-optic effect: (i) the Pockels effect that is proportional to the electric field, and (ii) the Kerr effect that is proportional to square of the electric field.

Substances exhibiting the Kerr effect were adopted early on for high-speed optical shutters, and have been actually used for special measuring instruments. The Kerr effect was found by J. Kerr in 1875. Well-know substances exhibiting the Kerr effect are organic liquid materials such as nitrobenzene, carbon disulfide, and the like. Apart from the optical shutter, these substances are used for, for example, high electric field strength measurement for an electric cable or the like.

Later on, research has been conducted to utilize a large Kerr constant of the liquid crystal materials for use in light modulation devices, light deflection devices, and optical integrated circuits. There has been a report of one liquid crystal compound which has a Kerr constant more than 200 times higher than that of nitrobenzene.

Under such circumstances, studies for using the Kerr effect to a display device have started. In view of the fact that the refractive index of a material exhibiting the Kerr effect is proportional to the square of electric field application, an assumed effect by use of the material exhibiting the Kerr effect as the orientational polarization attains a relatively low voltage driving than the orientational polarization made of a material having the Pockels effect. Further, with its original response property of several μ seconds to several m seconds, the substance exhibiting the Kerr effect is assumably suitable for a high-speed response display device.

Under the circumstances, for example, Documents 1, 2 and 3 detailed below propose a display element which is formed by sealing in a medium made of a liquid crystal material between a pair of substrates, and applying a voltage perpendicular or parallel to the substrates so as to induce the Kerr effect. Particularly, in the display device of Document 1, an alignment film is deposited on each of the planes of the pair of substrates in contact with the medium.

In such a display element, two polarizers with axes orthogonal to each other are provided outside the substrates, respectively, so that the medium is optically isotropic when no electric field is applied, thereby displaying black, and generates a birefringence when an electric field is applied. In this way, the transmittance of display element changes, and displays gradation. This method achieves a significantly high value of contrast in the normal substrate direction.

However, those conventional display elements have not achieved significant reduction of driving voltage; and therefore are not sufficient for practical use.

Particularly, in the display device of Document 1, both planes of the pair of substrates in contact with the medium are respectively provided with alignment films, and therefore the voltage upon application of electric field is impressed to not only the medium but also the alignment films. Therefore, due to the voltage consumed for the alignment film, the amount of voltage impressed to the medium is reduced. Consequently, the display device of Document 1 offsets the effect of reduction of driving voltage.

REFERENCES

Document 1: Japanese Laid-Open Patent Application Tokukai 2001-249363 (published on Sep. 14, 2001)
Document 2: Japanese Laid-Open Patent Application Tokukaihei 11-183937/1999 (published on Jul. 9, 1999)

Document 3: Shiro Matsumoto, et al, "Fine droplets of liquid crystals in a transparent polymer and their response to an electric field", Appl. Phys, Lett., 1996, vol. 69, pp. 1044-1046

Document 4: Kazuya Saito, and Michio Sorai, "Thermodynamics of a unique thermo-tropic liquid crystal having optical isotropy", EKISHO, 2001, Vol. 5, No. 1, pp 20-27

Document 5: Jun Yamamoto, "Liquid crystal micro emulsion", EKISHO, 2000, Vol. 4, No. 3, pp. 248-254

Document 6: Yukihide Shiraishi, et al, "Palladium nano particle protected by liquid crystal molecule—Preparation and application to guest-host mode liquid crystal display element", Collected papers on polymer, December, 2002, Vol. 59, No. 12, pp. 753-759

Document 7: D. Demus et al. "Handbook of Liquid Crystals", Vol. 2B, pp. 887-900, Wiley-VCH, 1998

Document 8: Jun Yamamoto "First lecture of liquid crystal science experiment: Identification of liquid crystal phase: (4) Lyotropic liquid crystal", EKISHO, 2002, Vol. 6, No. 1, pp. 72-82

Document 9: Eric Grelet, et al, "Structural Investigations on Smectic Blue Phases", PHYSICAL REVIEW LETTERS, The American Physical Society, Apr. 23, 2001, vol. 86, No. 17, pp. 3791-3794

Document 10: Makoto Yoneya, "Examining nano-structured liquid crystal phase by molecule simulator", Liquid crystal, 2003, Vol. 7, No. 3, pp. 238-245

Document 11: Ryoichi Yamamoto, et al, "Organic electrooptic material", National Technical Report, December, 1976, Vol. 22, No. 6, pp. 826-834

Document 12: Takashi Kato et al., "Fast and High-Contrast Electro-optical Switching of Liquid-Crystalline Physical Gels: Formation of Oriented Microphase-Separated Structures", Adv. Funct. Mater., April 2003, vol. 13. No. 4, p 313-317

Document 13: Hirotsugu Kikuchi, et al., "Polymer-stabilized liquid crystal blue phases", p. 64-68, [online], Sep. 2, 2002, Nature Materials, vol. 1, searched by Internet on Jul. 10, 2003 <URL:http://www.nature.com/naturematerials>

Document 14: Michi Nakata, et al., "Blue phases induced by doping chiral nematic liquid crystals with nonchiral molecules", PHYSICAL REVIEW E, The American Physical Society, Oct. 29, 2003, VOLUME 68, NUMBER 4, p. 04710-1 to 04701-6

BRIEF SUMMARY

The technology disclosed herein provides a display element and a display device with less driving voltage than the conventional element/device.

A display element according to an example embodiment comprises: a pair of substrates, at least one of which is transparent; a medium held between the pair of substrates, a degree of optical anisotropy of the medium being changeable in response to application of an electric field; electric field applying means, provided on a first substrate of the pair of substrates, for generating an electric field in a direction parallel to the substrates so as to apply the electric field to the medium; and a horizontal or vertical alignment film provided on a second substrate of the pair of substrates.

As used herein, a "change in degree of optical anisotropy of the medium by and according to application of electric field" indicates a change in magnitude of optical anisotropy of the medium by application of electric field, in other words, a change in shape of the refractive index ellipsoid by application of electric field. More specifically, the display element of an example embodiment uses a change of the shape of refractive index ellipsoid depending on whether an electric field is applied or not, so as to change the display condition.

Refractive index of a material is generally not isotropic and differs for each direction. The anisotropy of the refractive index (one example of optical anisotropy) is indicated by an ellipsoid (refractive index ellipsoid). In general assumption, a plane which passes through the original point and is perpendicular to the traveling direction of the light wave is the cross section of the refractive index ellipsoid with respect to the light traveling in a certain direction. The major axial direction of the ellipsoid is the polarization component direction of the polarized light of light wave. The half length of the major axis corresponds to the refractive index for the polarization component direction. That is, if expressing optical anisotropy as a refractive index ellipsoid, in the conventional liquid crystal display element, display operation is carried out by utilizing rotation (change) of only the major axis (principal axis) of the refractive index ellipsoid, and the shape (the shape of cut surface of the ellipsoid) and size of the refractive index ellipsoid hardly changes. On the other hand, the display element of an example embodiment uses a change of the shape (the shape of cut surface of the ellipsoid) of refractive index ellipsoid depending on whether an electric field is applied or not, so as to change the display condition.

As described, because the conventional liquid crystal display element uses a change in an alignment direction of liquid crystal molecules, the response speed of the conventional liquid crystal display element is greatly influenced by intrinsic viscosity of liquid crystal. On the contrary, the aforementioned arrangement uses the change in the magnitude of the optical anisotropy in the medium so as to carry out displaying. For this reason, the response speed is not greatly influenced by the intrinsic viscosity of the liquid crystal unlike the conventional display element. Therefore, the arrangement allows realization of high-speed response. Further, the high-speed responsiveness of the present display element can be used for a field sequential color display device.

In the conventional display element, the driving temperature is limited to a vicinity of a Nematic phase/isotropic phase transition point, and therefore very precise temperature control is required. On the other hand, an example embodiment of the technology disclosed herein only requires maintenance of temperature at which the degree of optical anisotropy of the medium can be changed in response to application of an external field. Thus, the technology disclosed herein allows easy temperature control.

With this arrangement, the medium exhibits optical isotropy when no electric field is applied, and becomes optically anisotropic when an electric field is applied. In this case, the shape of refractive index ellipsoid changes according to whether or not an electric field is applied. That is, the display is performed by not changing the direction of the optical anisotropy but changing the degree of optical anisotropy (orientational order, refractive index). Therefore, it is possible to realize a display element with a wider range of driving temperature, a wider viewing angle characteristic, and high-speed response, in contrast to the conventional display element performing display by changing the direction of the optical anisotropy. Further, the display element of the technology disclosed herein may be arranged so that the medium exhibits optical anisotropy when no electric field is applied, and becomes optically isotropic when an electric field is applied. This arrangement also ensures effects of a wider viewing angle characteristic, and high-speed response.

Further, the horizontal/vertical alignment film ensures the alignment of medium even when the display element is turned on at a temperature lower than the phase transition temperature where the medium is not heated up enough for driving, that is, it has different physical condition to that for allowing-driving. Therefore, the optical contribution of the medium (with a different physical condition to that under the driving is possible) can be cancelled. On this account, it is possible to realize superior display before the display element is heated up. However, if the alignment film is formed above the electric field applying means, the effective voltage application to the medium, that is effective voltage application to the display medium is reduced.

In this view, with the foregoing arrangement, the electric field applying means, which generates an electric field in a direction parallel to the substrates so as to apply the electric field to the medium to cause optical modulation of the medium, is provided on one (a first substrate) of the pair of substrates; and a horizontal or vertical alignment film is provided on the other (second substrate) of the pair of substrates. In this arrangement, the horizontal/vertical alignment film is not provided on the substrate where the electric field applying means is provided. In this arrangement, the application of electric field from the electric field applying means to the medium is not performed through the alignment film. Therefore, the voltage level is not decreased because of the alignment film, and the driving voltage of the display element does not need to be increased, thereby ensuring reduction of driving voltage.

Further, the display device described herein includes a display element having one of the foregoing characteristics.

Therefore, according to an example embodiment, it is possible to obtain a display device with a wider driving temperature range, high-speed response, and superior viewing angle.

Additional objects, features, and strengths of the technology disclosed herein will be made clear by the description below. Further, the advantages of the technology disclosed herein will be evident from the following explanation in reference to the drawings.

BRIEF DESCRIPTION OF THE DRAWINGS

FIG. 4(a) is a cross sectional view illustrating the display element according to the present embodiment when no electric field is applied. FIG. 4(b) is a cross sectional view illustrating the display element according to the present embodiment when an electric field is applied. FIG. 4(c) is a cross sectional view illustrating a display element adopting the TN mode when no electric field is applied. FIG. 4(d) is a cross sectional view illustrating the display element adopting the TN mode when an electric field is applied. FIG. 4(e) is a cross sectional view illustrating a display element adopting the VA mode when no electric field is applied. FIG. 4(f) is a cross sectional view illustrating the display element adopting the VA mode when an electric field is applied. FIG. 4(g) is a cross sectional view illustrating a display element adopting the IPS mode when no electric field is applied. FIG. 4(h) is a cross sectional view illustrating the display element adopting the TN mode when an electric field is applied.

DESCRIPTION OF THE EMBODIMENTS

One example embodiment of the technology disclosed herein will be described below with reference to FIGS. 1 through 21.

A display element according to the present embodiment is provided in a display device, together with a driving circuit, signal lines (data signal line), scanning signal lines (scanning signal line), switching elements and the like.

Figure 14:
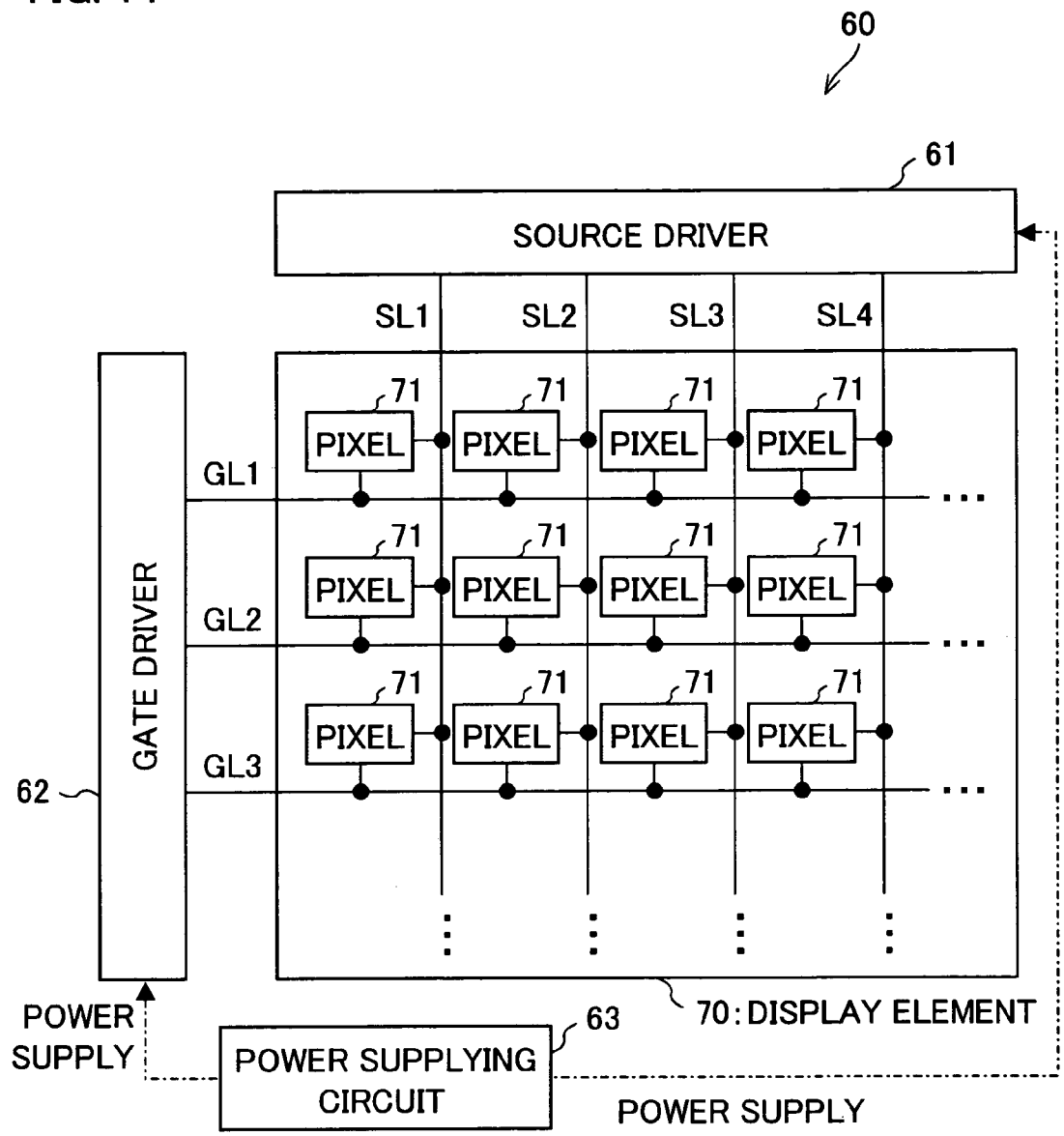
FIG. 14 is a block diagram schematically illustrating a major part of display device including the display element according to one example embodiment.
Figure 15:
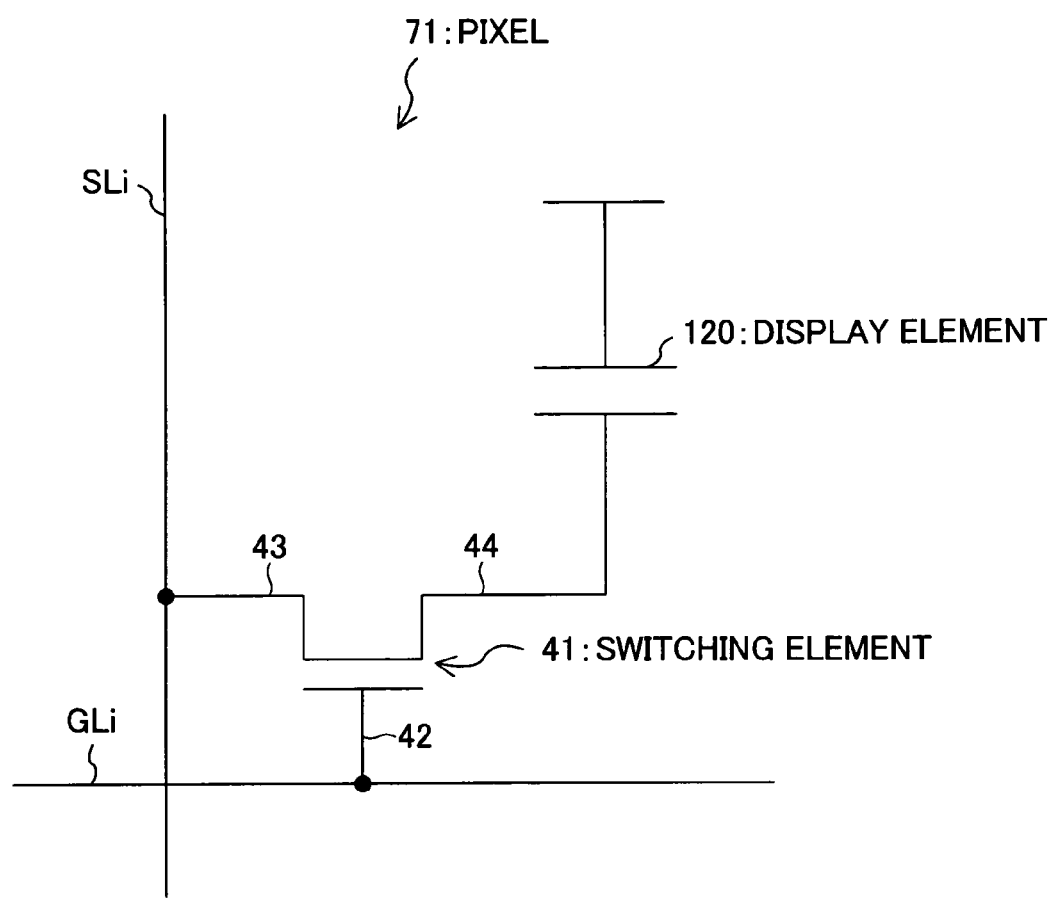
FIG. 15 is a schematic view illustrating a periphery of the display element used for the display device shown in FIG. 14.

First, with reference to FIGS. 14 and 15, the following explains a display device using a display element according to the present embodiment (a display device of the present embodiment). FIG. 14 is a block diagram schematically illustrating a major part of display device including the display element according to one embodiment of the present embodiment. FIG. 15 is a schematic view illustrating a periphery of the display element (display element 120) used for the display device shown in FIG. 14.

As shown in FIG. 14, the display device 60 according to the present embodiment includes a display element 70, a source driver 61 as a driving circuit, a gate driver 62, a power supply circuit 63 etc. The display element 70 includes pixels 71 are aligned in a matrix manner.

As shown in FIG. 15, each pixel 71 has the display element (display element 120) according to the present embodiment, and a switching element 41.

The display element 70 is provided with a plurality of data signal lines SL1 to SLn (n is an arbitrary integer not less than 2), and a plurality of scanning signal lines GL1 to GLm (m is an arbitrary integer not less than 2) which intersect with the data signal lines SL1 to SLn. The pixels 71 are provided corresponding to respective intersections of the data signal lines SL1 to SLn and scanning signal lines GL1 to GLm.

The power source circuit 63 supplies a voltage to the source driver 61 and the gate driver 62 in order to cause the display element 70 to perform display operation. With application of the voltage, in the display element 70, the source driver 61 drives the data signal lines SL1 to SLn, and the gate driver 62 drives the scanning signal lines GL1 to GLm.

The switching element 41 is realized by, for example, an FET (Field Effect Transistor), a TFT (Thin Film Transistor) or the like. The switching element 41 is connected to a scanning signal line GLi via its gate electrode 42, and to a data signal line SLi via its drain electrode 43. Further, the switching element 41 is connected to a display element 120 via its source electrode 24. The other and of the display element 120 is connected to a common electrode line (not shown) for all of the pixels 71. With this arrangement, in the pixels 71, the switching element 41 is turned ON when a scanning signal line GLi (i is an arbitrary integer not less than 1) is selected, and a signal voltage determined in accordance with the a display data signal inputted from a controller (not shown) is applied to the display element 120 via the data signal line SLi (i is an arbitrary integer not less than 1) from the source driver 61. After the switching element 41 is turned off after the selection period of the scanning signal line GLi is finished, the display element 70 preferably maintains the voltage level to the value when the switching element 71 is turned OFF.

The display element according to the present embodiment is provided with a medium layer 3, which is an optical modulation layer held between the two opposed substrates (substrates 1 and 2). Further, pectination electrodes (comb-like electrodes) 4 and 5 are provided on the substrate 1 on the surface facing the substrate 2, as electric field applying means for applying an electric field to the medium layer 3. Further, polarizers 7 and 8 are respectively provided on the substrates 1 and 2, each of them is provided on the surface opposite to that facing the other substrate.

Figure 1:
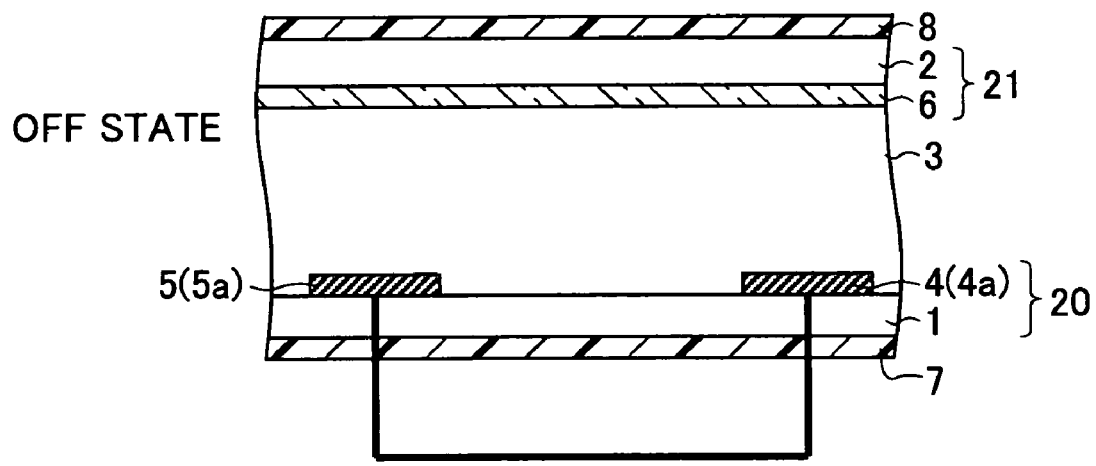
FIG. 1(a) is a cross sectional view schematically illustrating a major section of a display element according to one example embodiment, when no electric field is applied.
FIG. 1(b) is a cross sectional view schematically illustrating the major section of display element according to one example embodiment, when an electric field is applied.
Figure 1:
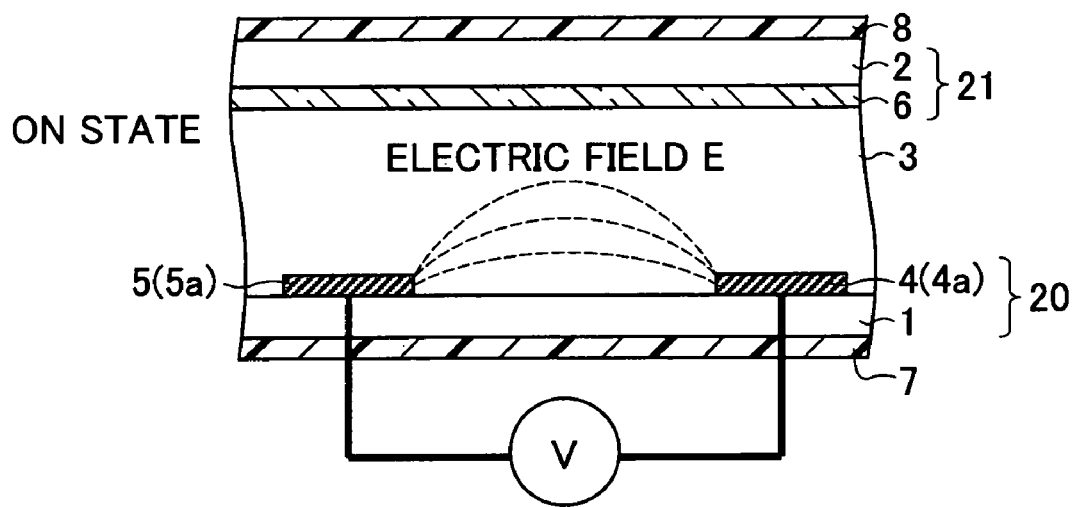
Figure 2:
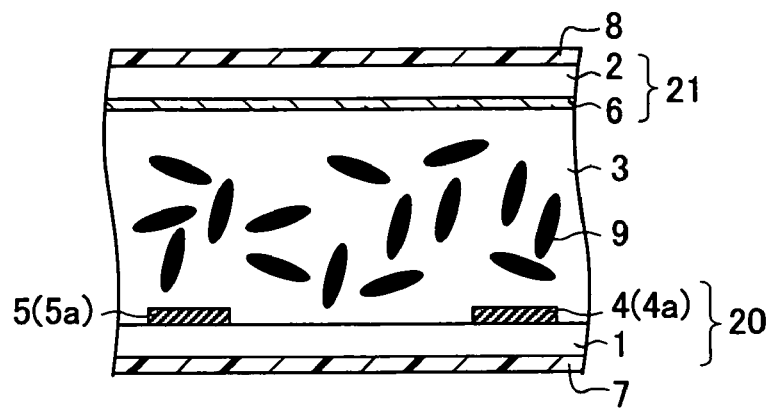
FIG. 2(a) is a cross sectional view schematically illustrates a medium of the display element when no electric field is applied.
FIG. 2(b) is a cross sectional view schematically illustrates the medium of the display element when an electric field is applied.
Figure 2:
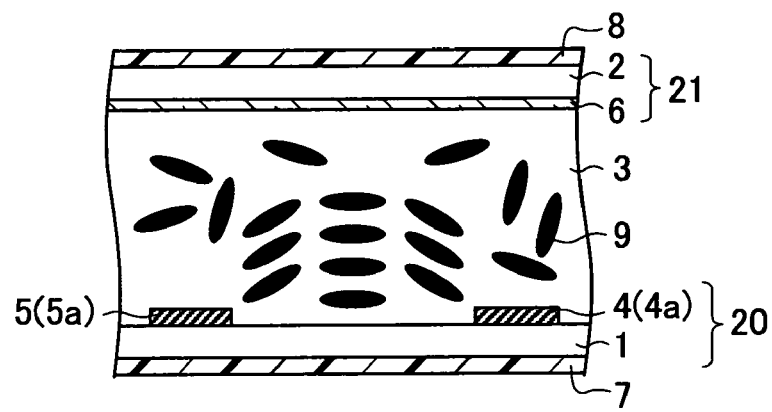

FIG. 1 illustrates a major section of display element according to the present embodiment. FIG. 1(a) is a cross sectional view schematically illustrating the major section of display element according to the present embodiment, when no electric field is applied (OFF state). FIG. 1(b) is a cross sectional view schematically illustrating the major section of display element according to the present embodiment, when an electric field is applied (ON state).

As shown in FIGS. 1(a) and 1(b), the display element according to the present embodiment includes a pair of opposed substrates (hereinafter referred to as a pixel substrate 20 and a counter substrate 21) at least one of which is transparent. Between the pixel substrate 20 and the counter substrate 21, a medium layer 3 is sandwiched. The medium layer 3 is made of a medium (hereinafter medium A) which can be optically modulated by application of an electric field, the medium layer 3 therefore serves as an optical modulation layer.

Further, as shown in FIGS. 1(a) and 1(b), the pixel substrate 20 and the counter substrate 21 include medium carrier means (optical modulation layer carrier means), which are realized by substrates 1 and 2; and polarizers 7 and 8 formed outward the substrates 1 and 2 (as outer planes of the pixel/counter substrates 20 and 21), respectively, i.e., on the other sides of the opposed surfaces of substrates 1 and 2.

At least one of the substrates 1 and 2 is made of a transparent substrate such as glass etc. Further, as shown in FIGS. 1(a) and 1(b), one of the pair of substrates 1 and 2 includes two opposed electrodes 4 and 5 on the surface opposite to the other substrate. The electrodes 4 and 5 are both function as electric field applying means for applying an electric field to the medium layer 3 in substantially a parallel (horizontal) direction to the substrate 1.

The electrodes 4 and 5 are made of an electrode material, such as transparent electrode material, e.g., ITO (Indium Tin Oxide). In the present embodiment, the electrodes 4 and 5 are 5 μm in line width, and 0.6 μm in thickness, and are disposed with a distance (electrode-electrode distance: electrode interval) of 5 μm, for example. It should be noted that the electrode material, line width, thickness, and electrode-electrode distance mentioned above are merely examples and the present invention is not limited to those.

Further, an alignment film 6 (dielectric thin film), having been rubbed, is formed over one surface of the substrate 2, which surface is opposite to the substrate 1, in other words, the alignment film 6 is formed over one surface of the counter substrate 21, which surface is opposite to the pixel substrate 20.

Figure 6:
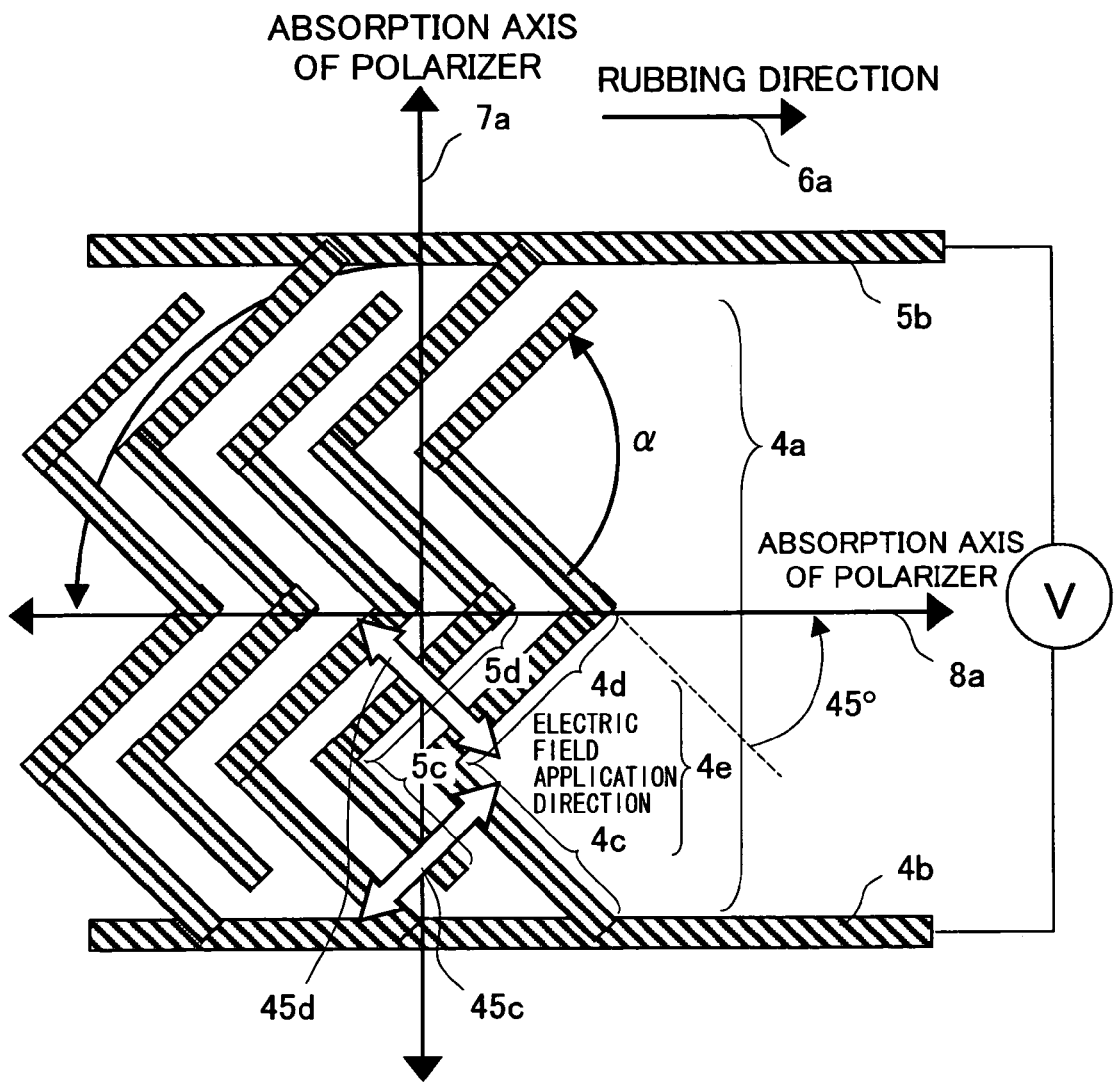
FIG. 6 is an explanatory diagram illustrating a relation between the arrangement of electrode and the absorption axis of polarizers, in the display element according to one example embodiment.

As shown in FIG. 6, the alignment film 6 is rubbed in a direction identical to one of the polarizer absorption axes 7a and 8a of the polarizers 7 and 8. Here, the alignment film 6 is subjected to alignment process by a horizontal rubbing (horizontal alignment processing) in which the alignment film 6 is rubbed in the substrate in-plane direction.

Further, the alignment film 6 is not limited to this rubbed horizontal alignment film, and may be a vertical alignment film.

There is no particular limitation for the alignment film 6, provided that it improves the desired orientational order characteristic of molecules constituting the medium A. Therefore, the alignment film 6 may be an organic film or an inorganic film. However, because an organic thin film shows superior orientational effect when used for the alignment film 6, it is preferable that the alignment film 6 be made of an organic thin film. Among various organic thin films, polyimide is highly stable and reliable, showing significant orientational effect. Therefore, a polyimide alignment film ensures high display quality in a display element.

The alignment film 6 may be realized by a commercially produced horizontal/vertical film.

Moreover, the alignment film 6 may contain a photosensitive functional group(s) (optical functional group, hereinafter). The optical functional group may be, but not limited to, a cinnamate-type, chalcone-type, or other similar groups causing dimerization, or azo-type or other similar groups causing isomerization.

When the alignment film 6 includes an optical functional group, the alignment control force can be generated in the alignment film 6 by irradiating the surfaces of the pixel substrate 20 and the counter substrate 21, i.e., the surface of the alignment film 6, with polarized ultra violet (this irradiation will be hereinafter referred to as polarized ultraviolet irradiation). In this way, the alignment film 6 can be easily rubbed (aligned) to a desired direction.

Fabrication of the display element can be performed by first bonding the pixel substrate 20 and the counter substrate 21 together, if necessary, via plastic beads, glass fiber spacer or the like, and then sealing the medium A therebetween.

The medium A used in the present embodiment causes a change in degree of optical anisotropy in response to application of electric field. Generally, external application of electric field Ej to a material causes an electric displacement $D_{ij}=\in_{ij} \cdot E_j$, as well as a slight change in dielectric constant $\in_{ij}$. Within the light frequencies, square of refraction index (n) is equivalent to the dielectric constant. Thus, the medium A may be expressed as a material whose refraction index is changeable in response to application of an electric field.

As described above, the display element according to the present embodiment performs display operation by utilizing that particular property (electric optical effect) of a substance by which the degree of refractive index of the material is changed in response to application of external electric field. Accordingly, the display element of the present embodiment differs from conventional liquid crystal elements utilizing rotation of the whole molecules (change in alignment of molecules) induced by electric field application. Thus, in the display element according to the present embodiment, the direction of optical anisotropy hardly changes, but instead the degree of optical anisotropy (mainly, electronic polarization or orientation polarization) changes to carry out the display.

The medium A used in the present embodiment may be a material, which is optically isotropic (at least macroscopically optically isotropic) when no electric field is applied but becomes optically anisotropic when an electric field is applied. Otherwise, the medium A may be a material, which is optically anisotropic when no electric field is applied, but loses the optical anisotropy and becomes optically isotropic (at least macroscopically optically isotropic) when an electric field is applied. Examples of such materials are materials showing the Pockels effect, materials showing the Kerr effect, or other similar materials. Typically, the medium A is a material, which is optically isotropic (at least macroscopically optically isotropic) when no electric field is applied but exhibits optical modulation when an electric field is applied (it is particularly preferable that the medium A causes an increase in birefringence by application of electric field).

The Pockels effect and the Kerr effect (which themselves are observed as isotropic phases) are electro-optical effects, which are respectively proportional to the electric field, and to square of the electric field. When no electric field is applied, the material with the Pockels effect or the Kerr effect exhibits an isotropic phase, and thus optically isotropic. When an electric field is applied, however, major axial directions of molecules of a compound are orientated along the direction of the electric field, in the region (part of the material) subjected to the electric field application, thereby generating birefringence in the region (part of the material). This generation of birefringence changes (modulates) transmittance of the material. For example, in a display mode using a material showing the Kerr effect, individual molecules randomly orientated are rotated individually to change their directions by controlling localization of electrons within one molecule by application of electric field. In this way, the display mode using the material showing the Kerr effect is very fast in responding speed. Moreover, because the molecules are randomly orientated, this display mode has no viewing angle limitation. Among the foregoing materials for the medium A, materials whose property is roughly proportional to the electric field or the square of the electric field may be considered as the materials showing the Pockels effect or the Kerr effect, respectively.

Examples of the materials showing the Pockels effect include organic solid materials, such as hexamine. However, the present invention is not limited to this, and various organic or inorganic materials showing the Pockels effect may be applicable as the medium A.

Moreover, examples of the materials showing the Kerr effect include those denoted below by structural formulas (1) through (7). However, the present invention is not limited to them.

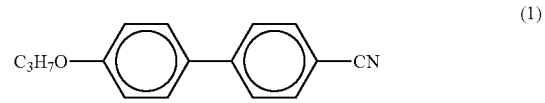

(1)

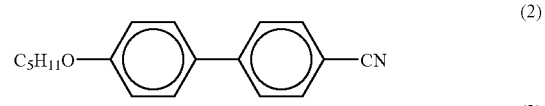

(2)

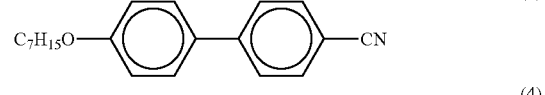

(3)

(4)

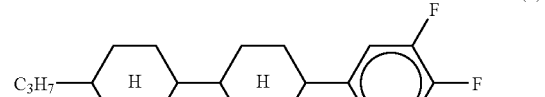

(5)

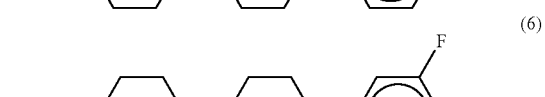

(6)

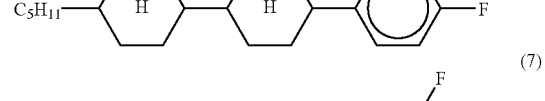

(7)

The liquid crystal material expressed by the structural formula (1) is 3OCB (4-cyano-4'-n-propyloxybiphenyl), the liquid crystal material expressed by the structural formula (2) is 5OCB (4-cyano-4'-n-pentyloxybiphenyl), the liquid crystal material expressed by the structural formula (3) is 7OCB (4-cyano-4'-n-heptyloxybiphenyl), the liquid crystal material expressed by the structural formula (4) is 5CB (4-cyano-4'-n-pentylbiphenyl), the liquid crystal material expressed by the structural formula (5) is 3HPFF (1,2-difluoro-4-[trans-4-(trans-4-n-propylcyclohexyl) cyclohexyl]benzene), the liquid crystal material expressed by the structural formula (6) is 5HPFF (1,2-difluoro-4-[trans-4-(trans-4-n-pentylcyclohexyl)cyclohexyl]benzene), and the liquid crystal material expressed by the structural formula (7) is 7HPFF (1,2-difluoro-4-[trans-4-(trans-4-n-heptylcyclohexyl)cyclohexyl] benzene).

The Kerr effect is observed in a material transparent to incident light. Therefore, the material showing the Kerr effect is used as a transparent medium. In general, an increase in temperature causes the liquid crystal material to transit from a liquid crystal phase having a short distance order to an isotropic phase having a random orientation at a molecular level. That is, the Kerr effect of the liquid crystal material is a phenomenon which is observed not in a Nematic phase but in a liquid at a temperature equal to or greater than the liquid phase-isotropic phase transition temperature or at a higher temperature. The liquid crystal material is used as a transparent dielectric liquid.

Dielectric liquids of the liquid crystal materials etc. become more isotropic with an increase in temperature of operating environment by heating (temperature attained by heating). Thus, in the case where the medium A is a dielectric liquid of a liquid crystal material or the like, the following three arrangements are suggested in order to use a transparent dielectric liquid, that is, to use a dielectric liquid transparent to visible light: (1) heating means (not shown, a heater etc.) is provided in the periphery of the medium layer 3 to heat the dielectric liquid to its transparent point or higher; (2) heat radiation from a back light or heat conduction from the back light and/or a peripheral driving circuit is used to heat the dielectric liquid to its transparent point or higher (in this case, the back light and/or the peripheral driving circuit act as heating means). Moreover, it may also be arranged so that (3) a sheet-type heater (heating means) is adhered to at least one of the substrates 1 and 2 to allow heating to a predetermined temperature. Further, to ensure transparency of the dielectric liquid, the material may be selected from substances whose transparent point is lower than the lower limit of operating temperature of the display element.

The medium A preferably contains a liquid crystal material. When a liquid crystal material is used for the medium A, it is preferable that the liquid crystal material be, in macroscopic view, a transparent liquid exhibiting the isotropic phase, and in microscopic view, contains clusters, which are agglomerations of molecules orientated in a certain direction in a short distance order. Since the liquid crystal material is transparent when used for the display element, meaning that the clusters are also used as transparent clusters with respect to visible light (being optically isotropic).

To achieve such an effect, the following various arrangements are suggested for the display element: the display element is adjusted in temperature by heating means such as a heater as described above; the medium layer 3 is segmented into small regions by using a polymer material or the like as described in Document 2; the liquid crystal material is processed to minute droplets with a diameter smaller than the wavelength of visible light, for example, 0.1 μm or less, thereby suppressing scattering of the light; the liquid crystal material is made of a liquid crystal compound that exhibits the transparent isotropic phase at the operating environment temperature (room temperature). The scattering of light is negligible when the diameter of the liquid crystalline material and a diameter (major axis) of the clusters is 0.1 μm or less, that is, smaller than the wavelength of visible light (wavelength of incident light). Thus, for example, if the diameter of the cluster is 0.1 μm or less, the clusters are also transparent with respect to visible light.

Note that, as described above, the medium A is not limited to the materials causing the Pockels effect or the Kerr effect. That is, the medium A may have an orderly molecular structure having a cubic symmetry smaller (for example, nano scale) than the wavelength of light, which structure therefore appears isotropic optically (see Documents 4, 7, 10, 13). The cubic phase is one of those liquid crystal phases of the liquid crystal material which can be used as the medium A. Examples of the liquid crystal materials showing the cubic phase include BABH8 which is represented by the following Structural Formula (5).

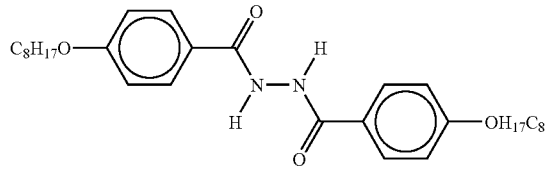

(8)

The application of electric field to one of those materials slightly distorts the microstructure, thereby inducing optical modulation.

At a temperature not less than 136.7° C. but not more than 161° C., BABH8 exhibits the cubic phase having an orderly structure smaller than optical wavelength (wavelength of visible light). BABH8 has a lattice constant=about 6 nm, that is smaller than the light wavelength by more than a factor of 10. Further, as described, BABH8 has the orderly structure (alignment order) smaller than the light wavelength at the aforementioned temperature range and therefore is optically isotropic when no electric field is applied. Using BABH8 for the display element of the present embodiment therefore allows good black display under crossed nicols.

On the other hand, when an electric field is applied between the electrodes 4 and 5 (pectination electrode) while the temperature of BABH8 is kept at or above 136.7° C. but not more than 161° C. by using, for example, the aforementioned heating means or the like, the structure (orderly structure) having the cubic symmetry is distorted. That is, within the foregoing temperature range, BABH 8 is isotropic when no electric field is applied but becomes optically anisotropic when an electric field (voltage) is applied.

As a result, birefringence occurs in the medium 3, allowing the display element to carry out good white display. Note that, the birefringence occurs in a certain direction but its degree is changeable by application of electric field (voltage). Moreover, in the temperature range not less 136.7° C. but not more than 161° C., the voltage-transmittance curve, which expresses a relationship between (a) transmittance and (b) the voltage applied between the electrodes (interleave electrodes) 4 and 5, draws a stable curve, that is, the voltage-transmittance curve is stable in a wide temperature range of about 20K. Therefore, using BABH8 for the medium A allows very easy temperature control. In other words, the medium layer 3 made of BABH8 is a thermally stable phase and is immune to any sudden change depending on the temperature. Therefore, temperature control of the medium layer 3 made of BABH8 is very easy.

Moreover, the medium A may be realized as a system filled with agglomerations of radially orientated liquid crystal molecules, each of agglomeration is smaller than the wavelength of light. With this arrangement, this system appears to be optically isotropic. Such a system may be realized by a liquid crystal micro emulsion, which is described in Document 5, a liquid crystal-particle dispersion system (a mixture system in which fine particulates are dispersed in a solvent (liquid crystal), liquid crystal fine particle dispersion system, hereinafter) described in Documents 6 and 8, or the like. The agglomeration with the radial orientation is distorted by application of electric field, thereby inducing optical modulation.

Note that, each of the foregoing liquid crystal materials may be a simple substance that originally exhibits a liquid crystal property on its own, or a mixture that exhibits a liquid crystal property as a result of mixing of plural substances, which mixture may contain other non-liquid crystal materials. Further, the liquid crystal material may be the material in which a polymer and liquid crystal are dispersed, which is described in Document 1. Moreover, a gelling agent described in Document 12 may be added to the material.

Further, the medium A preferably contains polar molecules. One suitable material of the medium A is nitrobenzene, which also exhibits the Kerr effect.

The followings are some specific materials or conditions of material suitable for the medium A. It should be noted that the present invention is not limited to the following examples.

[Smectic D Phase (SmD)]

Figure 8:
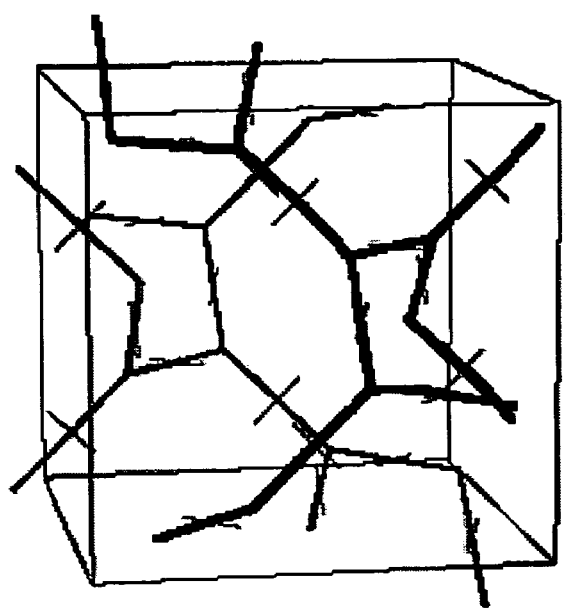
FIG. 8 is a schematic view illustrating, in the form of a rod network model, a structure of cubic symmetry in a smectic D phase.
Figure 9:
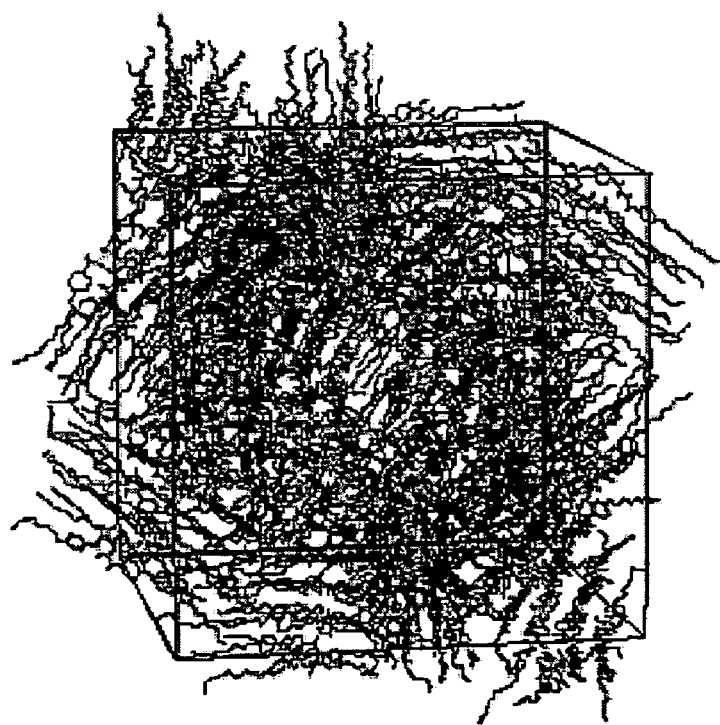
FIG. 9 is a schematic view illustrating a structure of cubic symmetry in a smectic D phase.

Smectic D phase (SmD) is one of liquid crystal phases of the liquid crystal materials that can be used as the medium A. As shown in FIGS. 8 and 9, Smectic D phase has a 3-dimensional lattice structure and a lattice constant smaller than the wavelength of visible light. In other words, the smectic D phase has a cubic symmetry. Therefore, smectic D phase is optically isotropic.

The following general formulas (9) and (10) express ANBC16, which is one of liquid crystal materials exhibiting the smectic D phase, described in Documents 4 and 7.

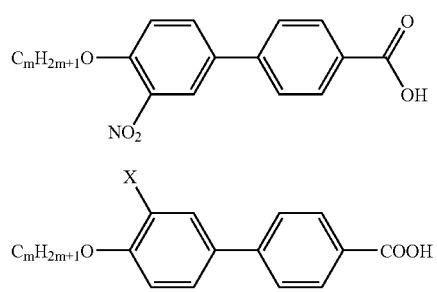

In the formula, specifically, m=16 in Formulas (9) and (10), and X is —NO$_2$ group in Formula (10).

ANBC16 exhibits the smectic D phase in a temperature range of from 171.0° C. to 197.2° C. In the smectic D phase, a plurality of molecules form a 3-dimentional lattice like a jungle gym (Registered Trademark). The lattice constant is several ten nm or less, which is less than the wavelength of visible light. That is, the smectic D phase has a cubic symmetry. Note that, the lattice constant of ANBC16 described in the present embodiment is about 6 nm. Because of this, the smectic D phase is optically isotropic.

However, by applying the electric field onto ANBC16, which is kept within the temperature range at which the smectic D phase appears, molecules of ANBC change their directions to be orientated along the electric field direction, thereby causing distortion in the lattice structure; that is, optical anisotropy occurs in ANBC16. Note that, the present invention is not limited to ANBC16: any material showing smectic D phase is applicable as the medium A for the display element according to the present embodiment.

[Liquid Crystal Micro Emulsion]

Liquid crystal micro emulsion (suggested in Document 5) is a generic term for a system (mixture system) in which thermotropic liquid crystal molecules are used for a O/W micro emulsion (in which water droplets are dispersed in an oil continuous phase by the aid of a surfactant) instead of the oil molecules.

Figure 10:
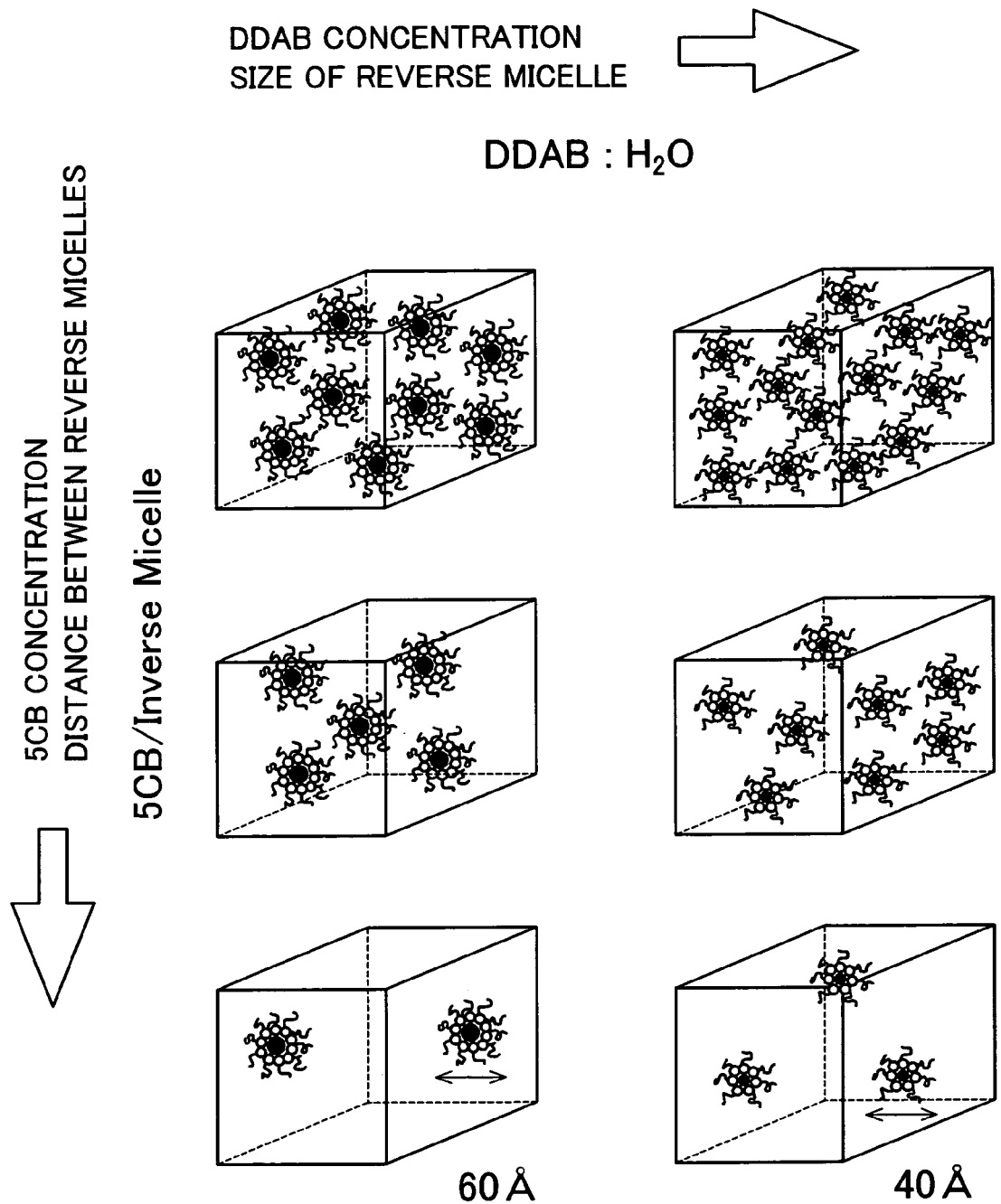
FIG. 10 is a schematic view illustrating an example of a reverse micelle phase mixture system of a liquid crystal micro emulsion.
Figure 11:
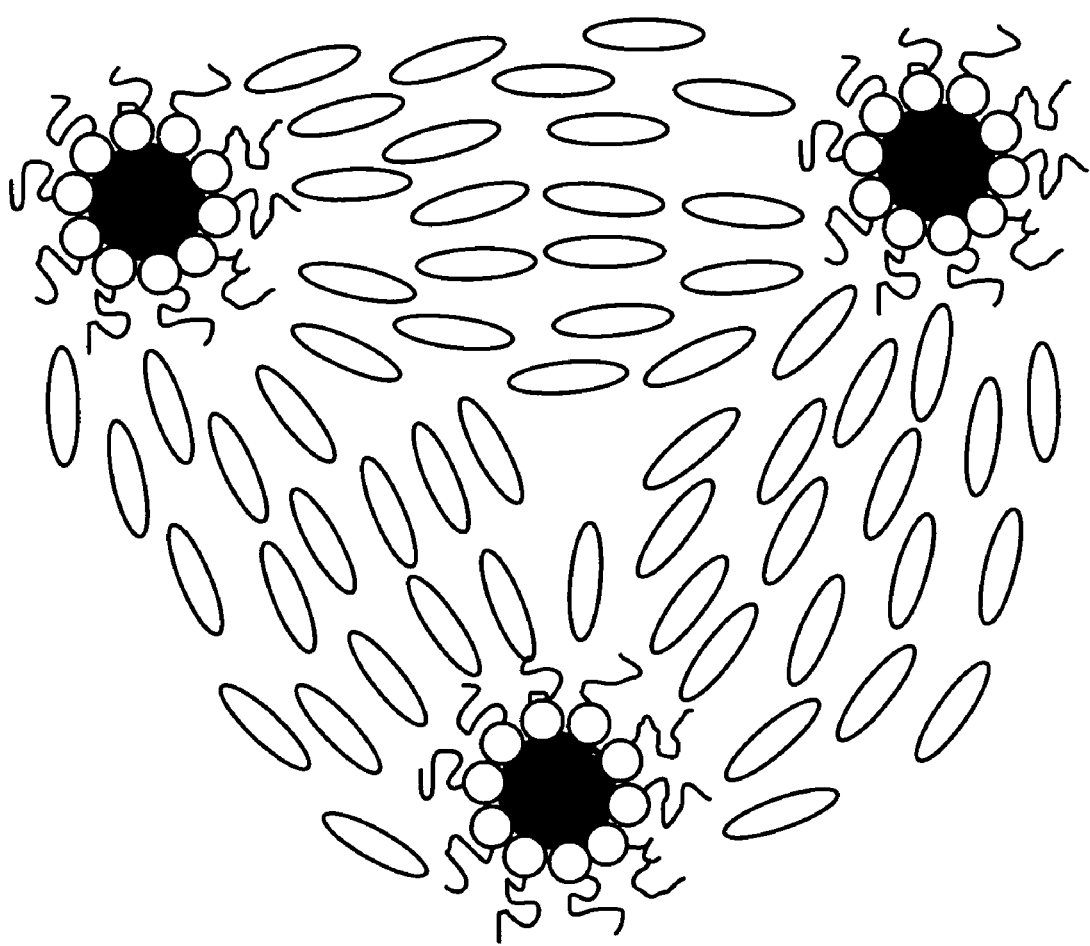
FIG. 11 is a schematic view illustrating another example of a reverse micelle phase mixture system of a liquid crystal micro emulsion.

Specific examples of the liquid crystal micro emulsion include a mixture system of pentylcyanobiphenyl (5CB) and an aqueous solution of didodecylammonium bromide (DDAB). Pentylcyanobiphenyl (5CB) is a thermotropic liquid crystal that shows Nematic liquid phase. Didodecylammonium bromide (DDAB) is a lyotropic liquid crystal that shows reverse micelle phase. This mixture system has a structure as schematically depicted in FIGS. 10 and 11.

Moreover, the mixture system typically has a structure such that its reverse micelles have a diameter of about 50 Å, and distances between the reverse micelles are about 200 Å. These scales are smaller than the wavelength of light roughly by a factor of 10. That is, the mixture system has a scale smaller than the wavelength of visible light. Moreover, the reverse micelles are randomly dispersed 3-dimentionall, and 5CB are aligned in a radial manner about each reverse micelle. Accordingly, the mixture system is optically isotropic.

By applying the electric field onto a medium made of the mixture system, the molecules are orientated along the electric field direction because 5CB is dielectrically anisotropic. That is, orientational anisotropy occurs the system that has been optically isotropic due to the radial orientation centered with respect to the reverse micelles. This results in optical anisotropy. The present invention is not limited to the mixture system: the medium A of the display element according to the present embodiment may be any liquid crystal emulsion that is optically isotropic when no electric field is applied thereon but becomes optically anisotropic when the electric field is applied thereon.

[Lyotropic Liquid Crystal]

Figure 12:
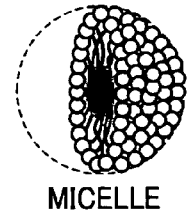
FIG. 12 is a view illustrating classification of lyotropic liquid phase.
Figure 12:
Figure 12:
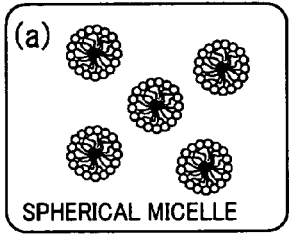
Figure 12:
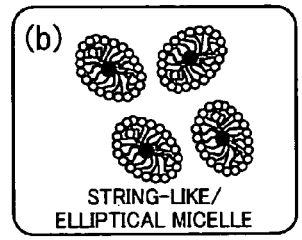
Figure 12:
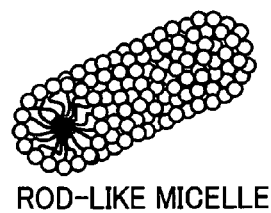
Figure 12:
Figure 12:
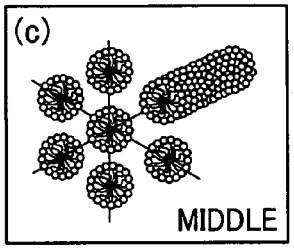
Figure 12:
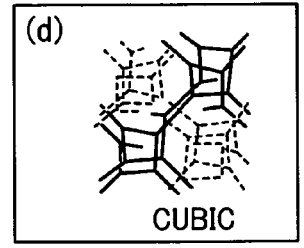
Figure 12:
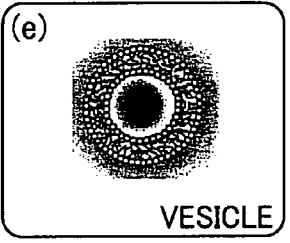
Figure 12:
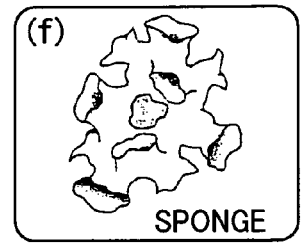
Figure 12:
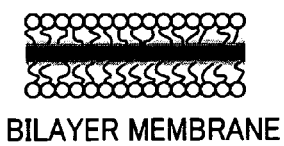
Figure 12:
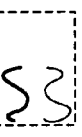
Figure 12:
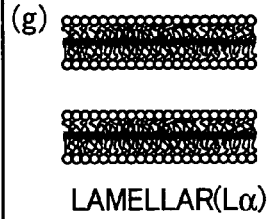
Figure 12:
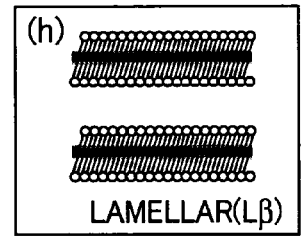
Figure 12:
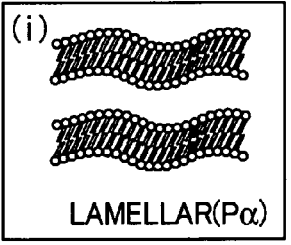
Figure 12:
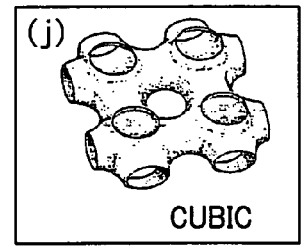
Figure 12:
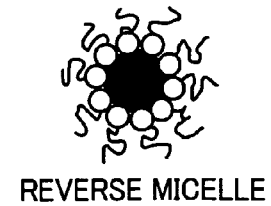
Figure 12:
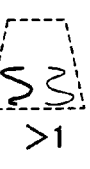
Figure 12:
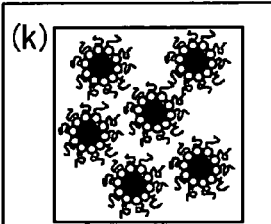
Figure 12:
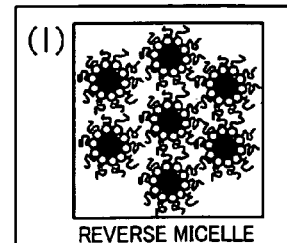

Lyotropic liquid crystal is a different liquid crystal in which molecules mainly constituting liquid crystal are dissolved in a solvent (water, an organic solvent or the like) that has other property. The particular phases here refer to those optically isotropic when no electric field is applied. Examples of the particular phases include a micelle phase, a sponge phase, a cubic phase, and a reverse micelle phase, which are described Document 8. FIG. 12 shows a classification of lyotropic liquid crystal phase.

There is a surfactant (which is an amphiphile) that shows a micelle phase. For example, an aqueous solution of sodium dodecyl sulfate, an aqueous solution of potassium palmitate, or the like forms spherical micelles. Further, in a mixture solution of polyoxyethylenenonylphenylether (which is a non-ionic surfactant) and water, a nonylphenyl group acts as a hydrophobic group while oxyethylene chain acts as a hydrophilic group, thereby forming micelles. As well as this, micelles are formed in an aqueous solution of styrene-ethyleneoxide block copolymer.

For example, in the spherical micelles, the molecules form a sphere as being packed in such a manner that they are separately orientated to every directions of the space (thereby forming molecule agglomerations). In this way, the micelles form a sphere. Moreover, the spherical micelles have a size smaller than the wavelength of light. Thus, the spherical micelles are not anisotropic but isotropic optically. However, when an electric field is applied onto the spherical micelles, the spherical micelles are distorted, causing optical anisotropy. Therefore, the lyotropic liquid crystal having the spherical micelles phase is also applicable as the medium A of the display element according to the present embodiment. The present embodiment is however not limited to the spherical micelles. Micelle phases having other shapes, e.g., string-like micelle phase, an elliptical micelle phase, rod-like micelle phase, or the like offers a similar effect to the medium A.

Moreover, it is generally known that, by changing its concentration, temperature, and surfactant, reverse micelles are formed with a hydrophilic group and a hydrophobic group counterchanged. Such reverse micelles offer a similar optical effect as the micelles. Therefore, by using the reverse micelle phase for the medium A, an effect equivalent to that in the use of the micelle phase can be obtained. Note that the aforementioned liquid crystal micro emulsion is an example of lyotropic liquid crystal having the reverse micelle phase (reverse micelle structure).

Further, as shown in FIG. 9, an aqueous solution of pentaethylene glycol-dodecylether, which is a non-ionic surfactant, exhibits the sponge phase or cubic phase when its concentration and temperature fall within certain ranges. Materials exhibiting the sponge phase and the cubic phase are transparent because the sponge phase and the cubic phase have an order (orientational order, orderly structure) smaller than the wavelength of light. That is, media having these phases are optically isotropic; however, they become optically anisotropic in response to application of an electric field. This is because their orientational order (orderly structure) is changed by (and according to) the application of the electric field (voltage). Thus, the lyotropic liquid crystal having the sponge phase or the cubic phase is also applicable to the medium A of the display element according to the present embodiment.

[Liquid Crystal Particulate Dispersed System]

Further, the medium A may be a liquid crystal particulate dispersed system in which latex particulates are mixed with the aqueous solution of pentaethyleneglycol-dodecylether (C12E5: a non-ionic surfactant), the latex particulates, with a diameter of about 100 Å, having a surface modified with a sulfate group. The orientational order (orderly structure) of the aforementioned liquid crystal particulate dispersed system is smaller than the optical wavelength. Though the aforementioned liquid crystal particulate dispersed system shows the sponge phase, the medium A of the present embodiment may be other liquid-crystal-particulate-dispersed system exhibiting the micelle phase, cubic phase, reverse micelle phase or the like. Note that, it is possible to form an orientational structure similar to that of the liquid crystal emulsion by using aforementioned DDAB in lieu of the latex particulate s.

It is preferable that the solvent contains one kind of the fine particles (liquid crystal fine particles), or two or more kinds of the fine particles.

It is also preferable that the fine particles have an average particle diameter of 0.2 μm or less. With the fine particles having an average particle diameter of 0.2 μm or less, stable dispersibility in the dielectric material layer 3 is ensured. Therefore, even after a long time, the fine particles do not aggregate, and the phase does not split. Thus, it is possible to sufficiently suppress unevenness of display element due to local unevenness of the fine particles as some of them are precipitated.

Further, it is preferable that a distance between the particles be 200 nm or less, more preferably 190 nm or less.

When a beam of light is incident on particles which are three-dimensionally dispersed, a diffraction ray is generated at a certain wavelength. When the diffraction ray is suppressed, the optical isotropy is improved and the contrast of the display element is also improved.

The wavelength $\lambda$ of light to be diffracted can be found according to a formula "$\lambda=2d$", although the wavelength $\lambda$ may change according to an incident angle of the beam of light. Here, d is the distance between the particles.

When the wavelength of diffraction ray is 400 nm or less, it is almost impossible to recognize the diffraction ray with human eyes. Therefore, it is preferable that $\lambda \leq 40$ nm. In this case, the distance d between the particles should be set to 200 nm or less.

According to CIE (Commission Internationale de l'Eclairage), the wavelength of 380 nm or less can not be recognized by human eyes. Therefore, it is more preferable that $\lambda \leq 380$ nm. In this case, the distance d between should be set to 190 nm or less.

In addition, when the distance between the particles is large, the particles do not sufficiently interact with each other, causing some difficulties in expressing the micelle phase, the sponge phase, the cubic phase, the reversed micelle phase, or the like. Therefore, it is preferable that the distance between the particles be 200 nm or less, more preferably 190 nm or less.

Moreover, it is preferable that the concentration (content) of the fine particles in the dielectric material layer 3 be from 0.05 wt % to 20 wt % with respect to the total weight of (i) the medium injected and sealed in the dielectric material layer 3 and (ii) the fine particles. The concentration of the fine particle in the dielectric material layer 3 is adjusted to a weight range from 0.05 wt % to 20 wt %, thereby suppressing the aggregation of the fine particles.

Note that, the fine particles injected and sealed in the dielectric material layer 3 are not especially limited, and may be transparent or opaque. Moreover, the fine particle may be organic fine particles such as polymer, inorganic fine particles, or metal fine particles.

When using the organic fine particle, it is preferable to use the fine particle in the form of polymer beads such as polystyrene beads, polymethylmethacrylate beads, polyhydroxy acrylate beads, or divinylbenzene beads. In this case, the beads may be cross-linked, or may not be cross-linked. When using the inorganic fine particles, it is preferable to use the fine particle such as glass beads or silica beads.

When using the metal fine particle, it is preferable to use alkali metal, alkali earth metal, transition metal, and rare earth metal. For example, titania, alumina, palladium, silver, gold, and copper are preferable. More specifically, it is preferable to use fine particles of titania, alumina, palladium, silver, gold, or copper, or it is preferable to use fine particles of oxides of titania, alumina, palladium, silver, gold, or copper. The above metal fine particle may consist of only one kind of the metal, or may consist of two or more kinds of the metals by alloying or mixing them with each other. For example, a silver particle may be plated with titania or palladium. When the metal fine particle is made only of silver, oxidization of the silver may change the property of display element. However, by covering the surface of silver particle with palladium or the like, such oxidization of silver can be prevented. Moreover, beads-shaped metal fine particle can be used without any modification, but it is allowable to use the beads-shaped fine particles having been thermally treated, or the particles with a surface containing an organic substance. This organic substance preferably shows liquid crystallinity.

It is preferable that the organic substance applied to the surfaces of metal fine particles are from 1 mol to 50 mol with respect to the metal of 1 mol.

The metal fine particle to which the above organic matter is applied is obtained by, for example, (i) dissolving or dispersing metal ions in a solvent, (ii) mixing the solvent with the above organic substance, and (iii) reducing the mixture. As to the solvent, it is possible to use water, alcohol, or ether.

Moreover, fine particles to be dispersed may be made of fullerene and/or carbon nanotube. This fullerene preferably contains carbon atoms in the form of a spherical shell. Further preferable is a stable fullerene with a carbon atom number (n) of 24 to 96. An example of fullerene is C60 globular closed-shell carbon molecule group which is made of 60 carbon atoms. Further, as for carbon nanotube, cylinder-shaped nanotube is preferred. Cylinder-shaped nanotube is made by rolling up a graphitoid carbon atom plane which has a thickness of several atomic layers.

Further, the form of the fine particle is not especially limited, but may be a globe, ellipsoid, block, column, or cone. In addition, the form of the fine particle may be a globe, ellipsoid, block, column, or cone, each of which has a projection. Furthermore, the form of the fine particle may be a globe, ellipsoid, block, column, or cone, each of which has an aperture. Moreover, the surface of the fine particle is not especially limited, but may be flat, or irregular, or with an aperture or a groove.

[Dendrimer]

Dendrimer is a 3-dimentionally highly-branched polymer in which every monomer unit is branched. Because it is highly branched, dendrimer has a spherical structure when its molecular weight exceeds a certain level. The spherical structure is a transparent substance because of its order (orderly structure, orientational order) smaller than the wavelength of light, which order is changeable by application of electric field, thereby causing dendrimer to have an optical anisotropy. Therefore, dendrimer is also applicable to the medium A of the display element according to the present embodiment. Moreover, a similar orientational structure to that of the liquid crystal micro emulsion can be obtained by using dendrimer in lieu of DDAB.

[Cholesteric Blue Phase]

Figure 13:
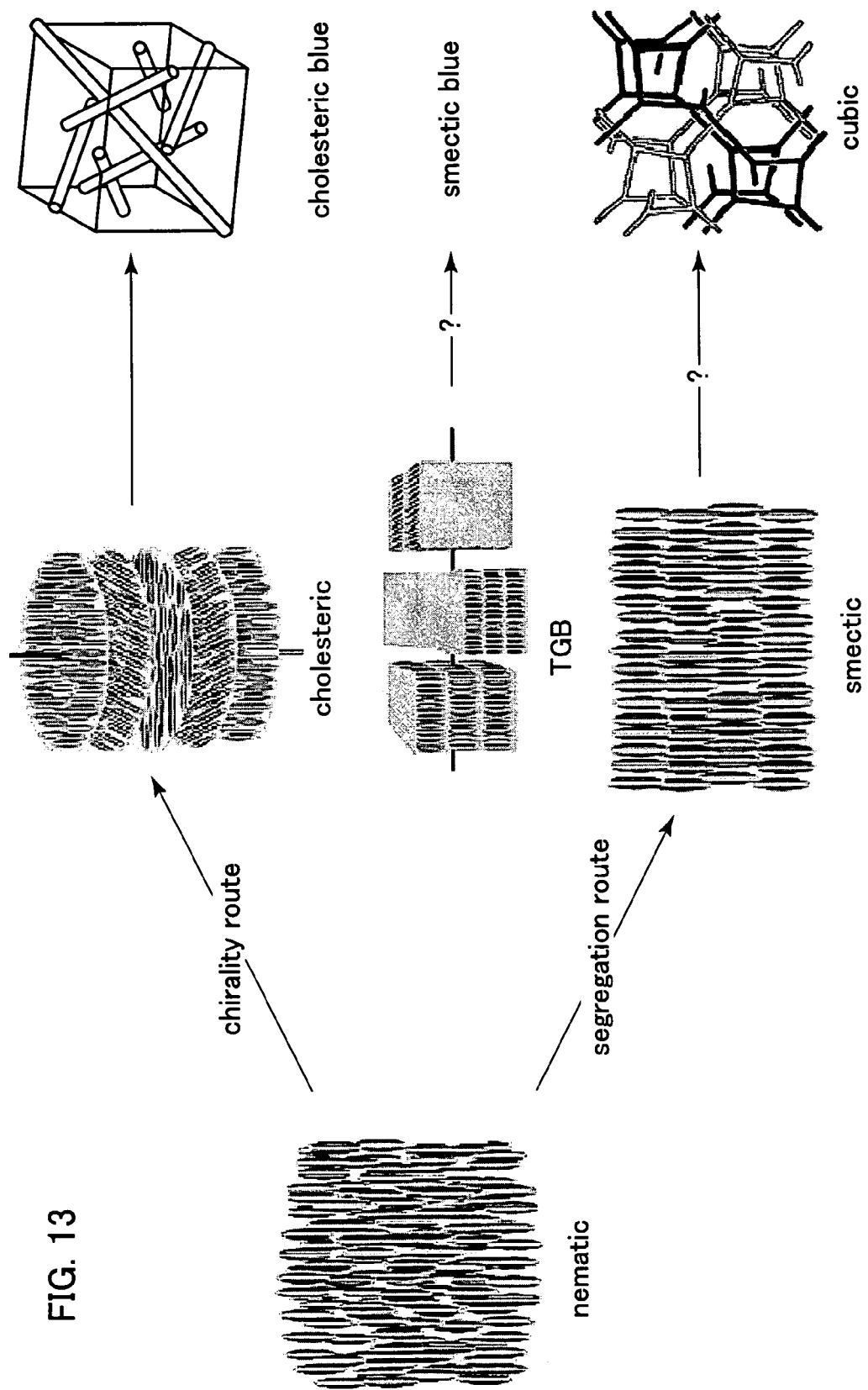
FIG. 13 is a schematic view illustrating various structures of the medium of display element according to example embodiments.

Further, the medium A may have cholesteric blue phase. FIG. 13 illustrates a schematic structure of cholesteric blue phase.

As shown in FIG. 13, one known characteristic of the cholesteric blue phase is a 3-dimensional periodic structure formed of screw axes, which makes the cholesteric blue phase highly symmetric (see Documents 10, 13 etc.). The cholesteric blue phase is substantially transparent because the cholesteric blue phase has an order (orderly structure, orientational order) smaller than the wavelength of visible light. However, the application of electric field (voltage) changes the degree of the orientational order in the cholesteric blue phase, thereby causing the cholesteric blue phase to exhibit optical anisotropy. That is, the cholesteric blue phase, which is optically isotropic generally, shows optical anisotropy (and/or changes the degree of its optical anisotropy) when an electric field is applied, as the electric field application causes the liquid crystal molecules to be orientated along the electric field direction, thus distorting the lattice.

One of the examples of materials showing the cholesteric blue phase is a compound prepared by mixing 48.2 molt % of "JC1041" (product name: a liquid crystal mixture made by Chisso Corporation), 47.4 mol % of "5CB" (4-ciano-4'-pentylbiphenyl; a Nematic liquid crystal), and 4.4 mol % of "ZLI-4572" (product name: a chiral dopant made by Merck Ltd.). This compound exhibits cholesteric blue phase in a temperature range of from 330.7K to 331.8K.

Moreover, as another example of a material in the cholesteric blue phase, it is possible to use a material obtained by mixing 67.1 wt % of ZLI-2293 (mixture liquid crystal produced by MERCK), 15 wt % of P8PIMB (1,3-phenylene bis[4-(4-8-alkylphenyliminomethyl-benzoate, banana-shaped-molecule (bent-molecule) liquid crystal: see the following structural formula (7)), and 17.9 wt % of MLC-6248 (chiral dopant produced by MERCK). The material shows the cholesteric blue phase in a temperature range from 77.2° C. to 82.1° C.

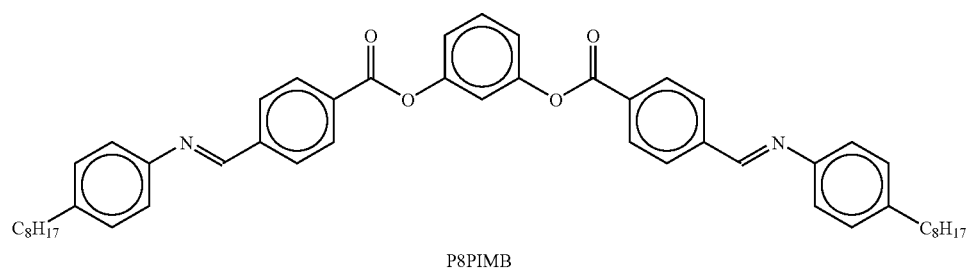

P8PIMB

Further, it is possible to freely change a mixture ratio of each material mentioned above. For example, a material obtained by mixing 69.7 wt % of ZLI-2293, 15 wt % of P8PIMB, and 15.3 wt % of MLC-6248 (chiral dopant) shows the cholesteric blue phase in a temperature range from 80.8° C. to 81.6° C.

Still another example of a material exhibits the cholesteric blue phase is a material obtained by mixing 67.1 wt % of ZLI-2293 (mixture liquid crystal produced by MERCK), 15 wt % of MHPOBC (4-(1-methylheptyloxycarbonyl)phenyl-1-4'-octylcarboxybiphenyl-4-carboxylate, linear-molecule liquid crystal: see the following structural formula (12)), and 17.9 wt % of MLC-6248 (chiral dopant produced by MERCK). The material shows the cholesteric blue phase in a temperature range from 83.6° C. to 87.9° C.

MHPOBC

Moreover, it is possible to freely change a mixture ratio of each material mentioned above. For example, a material obtained by mixing 69.7 wt % of ZLI-2293, 15 wt % of MHPOBC, and 15.3 wt % of MLC-6248 (chiral dopant) shows the cholesteric blue phase in a temperature range from 87.8° C. to 88.4° C.

Note that, the cholesteric blue phase did not appear when mixing only ZLI-2293 and MLC-6248, but appeared when banana-shaped-molecule (bent-shaped-molecule) liquid crystal P8PIMB or linear-molecule liquid crystal MHPOBC are added.

In the above example, a racemic body is used as the linear-molecule liquid crystal. However, the present invention is not limited to this, but a chiral body may be used. Moreover, one or plural chiral carbons may be contained therein. Among the various linear-molecule liquid crystals, it is preferable to use one having an anticlinic structure (in which each layer is oriented to different direction), such as the linear-molecule liquid crystal MHPOBC.

Moreover, the linear-molecule liquid crystal is a generic term which refers to a liquid crystal molecule forming in the chemical structural formula an oblong, which is almost a straight line. Needless to say, the actual configuration is not necessarily in a single plane as in the chemical structural formula, but may be bent.

Moreover, the banana-shaped-molecule (bent-shaped-molecule) liquid crystal is a generic term for expressing a liquid crystal molecule having a bent portion in the chemical structural formula. The banana-shaped-molecule (bent-shaped-molecule) liquid crystal is not limited to P8PIMB. Not only the banana-shaped-molecule (bent-shaped-molecule) liquid crystal whose bent portion is a benzene ring (phenylene group, etc) but also the banana-shaped-molecule (bent-shaped-molecule) liquid crystal whose bent portion is combined by a naphthalene ring or a methylene chain may be used. For example, compounds shown by the following structural formulas (13) to (16) are preferable.

(13)

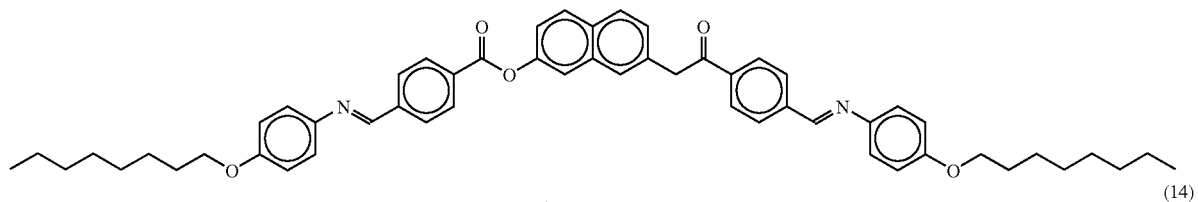

(14)

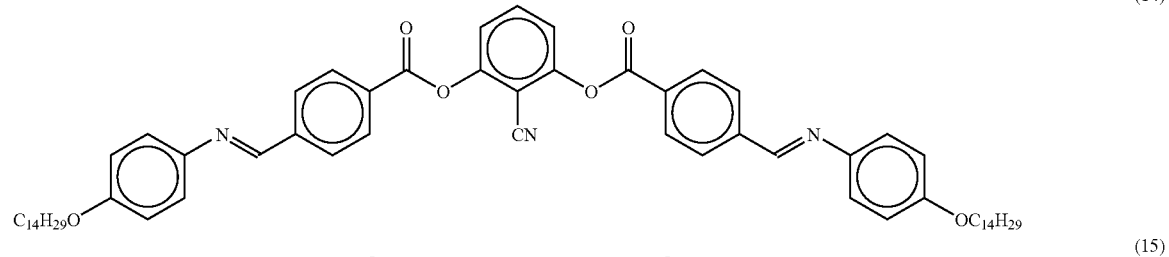

(15)

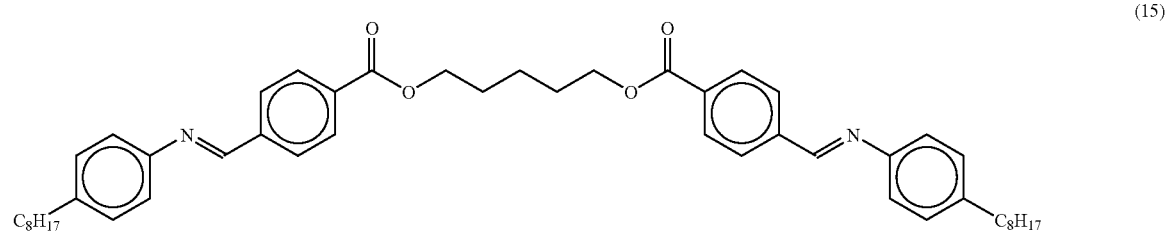

(16)

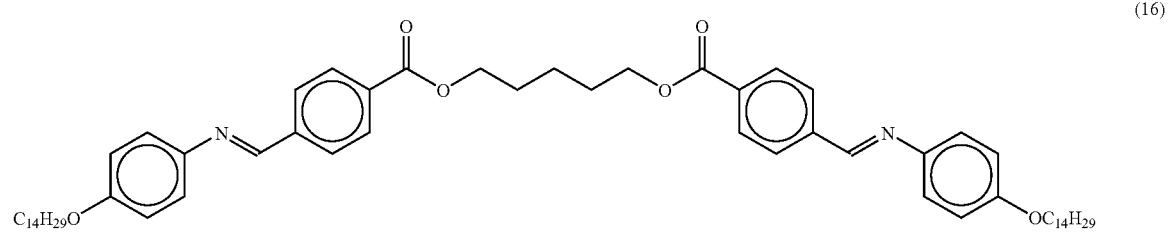

As described above, the cholesteric blue phase applicable to the technology disclosed herein has a defective order smaller than the optical wavelength, therefore the material is substantially transparent, and is substantially optically isotropic, at the range of optical wavelength. Here, such a characteristic expressed as "substantially optically isotropic" means the condition such that the cholesteric blue phase is optically isotropic except for the color expression reflecting a helical pitch of the liquid crystal. This phenomenon of selectively reflecting light with the wavelength reflecting the helical pitch is called selective reflection. When the wavelength band of selective reflection falls outside the visible range, the color is not shown (the color is not recognized by human eyes). On the other hand, when the wavelength band of selective reflection falls within the visible range, the phase expresses the color corresponding to the wavelength.

When the wavelength band of selective reflection or the helical pitch is 400 nm or more, the cholesteric blue phase expresses a color which reflects the helical pitch of the liquid crystal. Since the cholesteric blue phase thus reflects visible light, the color expressed is recognizable by human eyes. Therefore, for example, when the display element of the technology disclosed herein is applied to fabricate a full color TV, it is not preferable that its reflection peak be in the visible range.

Note that, the wavelength of the selective reflection depends on an incident angle of light onto the screw axis of the medium. On this account, when the structure of the medium is not in one dimension, that is, when the structure of the medium is a three dimensional structure (for example, the cholesteric blue phase), the incident angle of light onto the screw axis distributes. Therefore, the width of the wavelength of the selective reflection also distributes.

On this account, it is preferable that the wavelength band of selective reflection of blue phase or the helical pitch of blue phase be in the visible range, 400 nm or less. As long as the wavelength band or the helical pitch is 400 nm or less, the color expressed is not recognizable by human eyes.

According to CIE (Commission Internationale de l'Eclairage), the wavelength of 380 nm or less can not be recognized by human eyes. Therefore, it is more preferable that the wavelength band of the selective reflection or the helical pitch be 380 nm or less. In this case, it is possible to securely prevent the above color from being visible by human eyes.

Moreover, the above color relates not only to the helical pitch and the incident angle but also to the average refractive index of the dielectric material. In this case, the light of the color is a color having a wavelength width $\Delta\lambda=P\Delta n$ and centering on the wavelength $\lambda=nP$. Here, n is the average refractive index, and P is the helical pitch. Moreover, $\Delta n$ is the anisotropy of the refractive index.

$\Delta n$ differs depending on the dielectric material. For example, when the liquid crystal material is injected and sealed into the dielectric material layer 3, the average refractive index of the liquid crystal material is about 1.5, and $\Delta n$ is about 0.1. In this case, to ensure that the color expression is outside the visible range, it is required to satisfy: $\lambda=400$ nm, the helical pitch $P=400/1.5=267$ nm. Moreover, $\lambda=0.1\times 267=26.7$. More specifically, to ensure that the expressed color is not recognized by human eyes, the helical pitch of the medium should be set to 253 nm or less, which value is found by subtracting 13.4 nm (about half of 26.7 nm) from 267 nm. In other words, the expressed color can be avoided when the helical pitch of the medium is 253 nm or less.

The above explanation refers to the formula $\lambda=nP$, where $\lambda$ is 400 nm. However, when $\lambda$ is 380 nm which is the wavelength unrecognizable by human eyes according to CIE (Commission Internationale de l'Eclairage), the helical pitch needs to be set to 240 nm or less so as to ensure that the color is outside the visible range. Specifically, in the medium with a helical pitch=240 nm, the problem of color expression does not occur.

For example, there is a material prepared by mixing 50.0 wt % of JC1041 (mixture liquid crystal, produced by CHISSO), 38.5 wt % of 5CB (4-cyano-4'-pentyl biphenyl, nematic liquid crystal), and 11.5 wt % of ZLI-4572 (chiral dopant, produced by MERCK). At a temperature of about 53° C. or lower, this mixture transits its phase from a liquid isotropic phase to an optical isotropic phase. However, the color is not shown because the helical pitch is about 220 nm and is below the visible range.

As described above, the cholesteric blue phase, which is suitable for the technology disclosed herein, has a defective structure smaller than the optical wavelength. Since the defective structure results from the great torsion between adjacent molecules, it is necessary that a dielectric medium showing the cholesteric blue phase shows chirality in order to express a great helical structure. To express such a great helical structure, it is preferable to add a chiral dopant to the dielectric medium.

Although the concentration of the chiral dopant depends on a twisting force of the chiral dopant, it is preferable that the concentration of the chiral dopant be 8 wt %, or 4 mol % or more. When a ratio of the chiral dopant is 8 wt %, or 4 mol % or more, the temperature range of the cholesteric blue phase is about 1° C. or more. When a ratio of the chiral dopant is 8 wt %, or less than 4 mol %, the temperature range of the cholesteric blue phase becomes narrower.

It is further preferable that the concentration of the chiral dopant be 11.5 wt % or more. When the concentration of the chiral dopant is 11.5 wt % or more, the helical pitch is about 220 nm, so that the color is not shown.

Furthermore, it is preferable that the concentration of the chiral dopant be 15 wt % or more. In case of causing the cholesteric blue phase by adding the banana-shaped-molecule (bent-shaped-molecule) liquid crystal or the linear-molecule liquid crystal having the anticlinic structure, a chiral dopant with a concentration=15 wt % or more causes the cholesteric blue phase at a temperature range of about 1° C., and a chiral dopant with a concentration=17.9 wt % further widens the temperature range of the cholesteric blue phase.

Thus, a chiral dopant with a high concentration is preferable, as it eases expression of the cholesteric blue phase, thereby reducing the helical pitch of the cholesteric blue phase.

However, it should be noted that, when an excessive amount of chiral dopant is added, the liquid crystallinity of the entire dielectric material layer 3 decreases. The lack of liquid crystallinity causes a decrease in degree of the optical anisotropy generated by application of electric field, thus lowering the function of display element. The decrease of liquid crystallinity also induces a decrease in stability of cholesteric blue phase. This causes some difficulties in enlarging the temperature range of cholesteric blue phase. Based on this theory, the upper limit of concentration of chiral dopant is determined, which is 80 wt % according to the analysis of the present applicants. That is, it is preferable to use chiral dopant with a concentration=80 wt % or less.

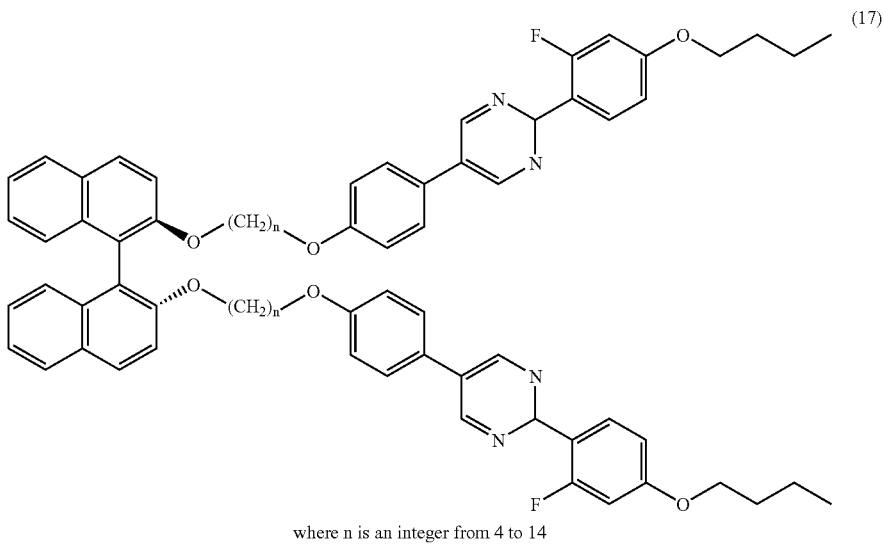

where n is an integer from 4 to 14

In the present embodiment, ZLI-4572 or MLC-6248 are used as the chiral dopant. However, the present invention is not limited to them. For example, a commercial product such as S811 (produced by E. MERCK), or an axial-asymmetry chiral dopant may be used. One example of the axial-asymmetry chiral dopant is a axial-asymmetry binaphthyl derivative (see the following compound (17)).

Note that, when n is an odd number, the compound (17) shows the blue phase on its own in some cases. For example, when n=7, the compound (17) shows the blue phase at a temperature from about 103° C. to about 94° C. Therefore, when the compound (17) shows the blue phase on its own (when the compound (17) has the liquid crystallinity), it is possible to use the compound (17) alone as the medium to be injected and sealed into the dielectric material layer 3. Further, the compound (17) may be used as the chiral dopant.

Note that, the above example deals with the effects of chiral dopant to the cholesteric blue phase. However, addition of chiral dopant is effective not only to the cholesteric blue phase, but also to dielectric media that exhibit the liquid crystal phase, such as the smectic blue phase or Nematic phase.

[Smectic Blue Phase]

Further, the medium A may have smectic blue phase. FIG. 13 illustrates a schematic structure of smectic blue phase.

As shown in FIG. 13, the smectic blue (BPSm) phase has a highly symmetric structure (for example, see Documents 9 and 10), similarly to the cholesteric blue phase. Because it has an order (orderly structure, orientational order) smaller than the optical wavelength, a material in the smectic blue phase is transparent. However the application of electric field changes the degree of orientational order of the smectic blue phase, thereby causing the smectic blue phase to exhibit the optical anisotropy. That is, the smectic blue phase is optically isotropic generally, but application of electric field makes the liquid crystal molecules to be orientated along the electric field direction, and causes distortion of the lattice. As a result, the smectic blue phase becomes optically anisotropic.

One of examples of the materials that exhibit the smectic blue phase is FH/FH/HH-14BTMHC or the like. This material exhibits BPSm 3 phase at a temperature ranging from 74.4° C. to 73.2° C., BPSm 2 phase at a temperature ranging from 73.2° C. to 72.3° C., and BPSm 1 phase at a temperature ranging from 72.3° C. to 72.1° C. Since the BPSm phase has a highly symmetric structure as described Document 10, it is optically isotropic generally. Moreover, when the electric field is applied onto the material FH/FH/HH-14BTMHC, the liquid crystal molecules are orientated along the electric field direction, thereby distorting the lattice. As a result the material exhibits optical anisotropy. Therefore, this material is applicable to the medium A of the display element according to the present embodiment.

As described above, as long as its optical anisotropy (refraction index, degree of orientational order) is changeable (changeable) in response to application of electric field, any material may be used for the medium A, for example, a material showing the Pockels effect or a material showing the Kerr effect; a material made of molecules that exhibits one of the cubic phase, smectic D phase, cholesteric blue phase, and smectic blue phase; or the lyotropic liquid crystal or liquid crystal particulates dispersed system that exhibits one of the micelle phase, reverse phase, and cubic phase. Moreover, the medium A may be the liquid crystal micro emulsion, dendrimer (dendrimer molecules) amphiphilic molecules, copolymer, or other polar molecules.

The medium A is not limited to the liquid crystal material but preferably has an orderly structure (orientational order) smaller than the optical wavelength, as such an orderly structure makes the medium A optically isotropic. With this arrangement using the medium which has the orderly structure smaller than the optical wavelength when the electric field is applied, it is possible to ensure the change in display state according to whether the electric field is applied onto the medium, or no electric field is applied onto the medium.

In the following description of present embodiment, it is assumed that the medium A is made of a mixture (medium mixture, hereinafter) of equal amount of liquid crystal materials represented by structural Formulas (1), (2) and (3), i.e., 30CB, 50CB and 70CB. The medium A is however not limited to this but may be one of the above materials alone, or other mixtures.

In the present embodiment, the electrodes 4 and 5 made of ITO had a line width of 5 μm and an electrode-electrode distance of 5 μm, a medium layer 3 had a layer thickness (equivalent to the electrode-electrode distance) of 5 μm; and the medium A is formed of the foregoing medium mixture. Then electric field application is performed to the medium mixture which is kept at a temperature above but near the phase transition temperature for Nematic-isotropic phase (temperature slightly higher than the phase transition temperature, for example, +0.1K). As a result, the transmittance of the medium A is changed. Note that, the mixture is Nematic at a temperature less than 66° C., but is isotropic at a higher temperature.

Next, the display principle of the display element according to the present embodiment is explained below referring to FIGS. 2(a) and 2(b), FIG. 3, FIGS. 4(a) through (g), and FIGS. 5(a) and 5(b).

The following description mainly discuses an arrangement in which the display element according to the present embodiment is a transmission-type display element and is substantially optically isotropic or preferably optically isotropic when no electric field is applied, but becomes optically anisotropic when the electric field is applied. However, it should be noted that present invention is not limited to this arrangement.

FIG. 2(a) is a plan view schematically illustrating a major part of structure of the display element according to the present embodiment when no electric field is applied (OFF state). FIG. 2(b) is a plan view schematically illustrating a major part of structure of display element when an electric field is applied (ON state). Note that, FIGS. 2(a) and 2(b) both show a structure of one pixel. Here, for ease of explanation, the counter substrate 21 is omitted here.

Figure 3:
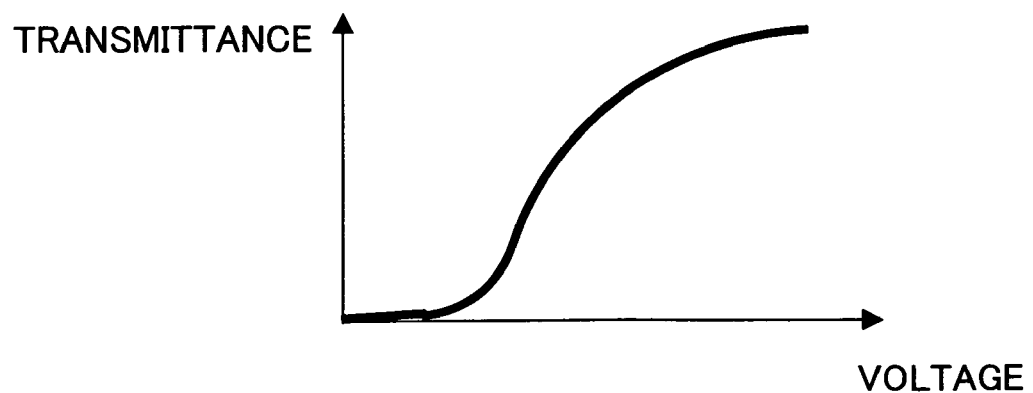
FIG. 3 is a graph illustrating a relation in the display element between an applied voltage and transmittance.
Figure 4:
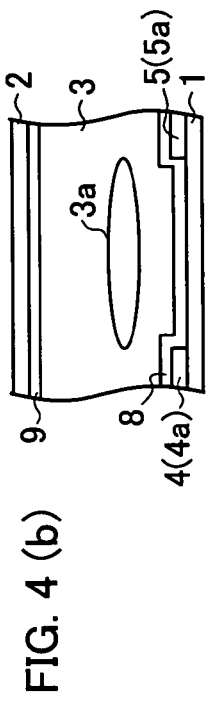
FIGS. 4(a) to 4(h) are cross sectional views showing difference in display principle between the foregoing display element and a conventional display element, by schematically illustrating (i) shapes and main axis directions of average optical refractive index ellipsoid of the medium when no electric field is applied and when an electric field is applied.
Figure 4:
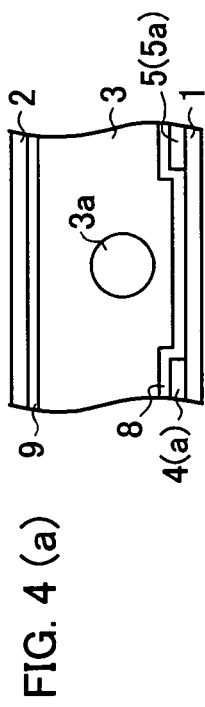
Figure 4:
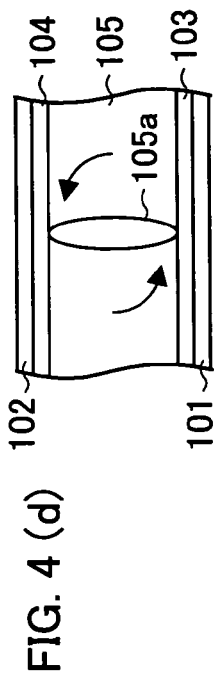
Figure 4:
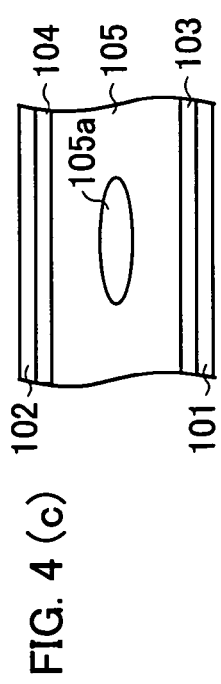
Figure 4:
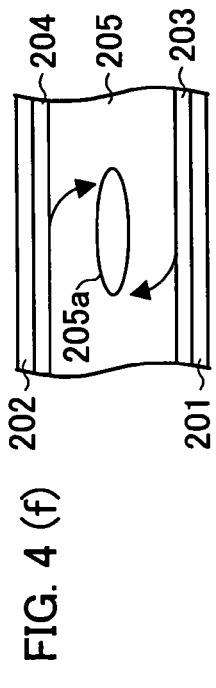
Figure 4:
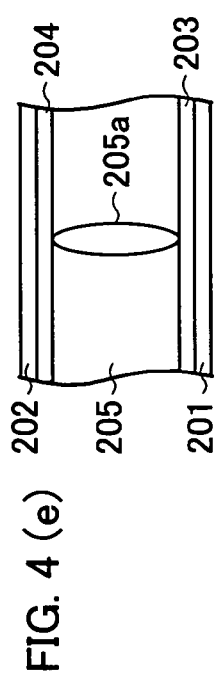
Figure 4:
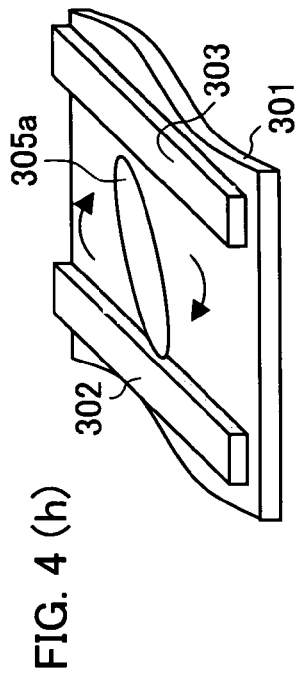
Figure 4:
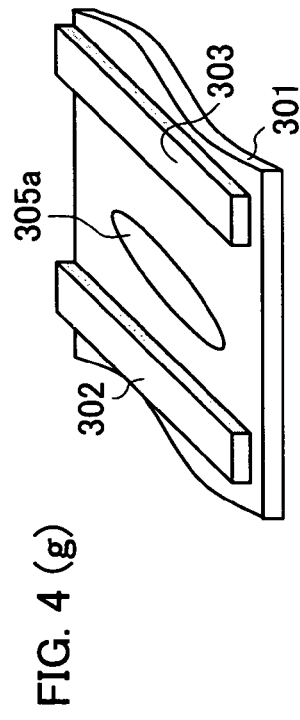
Figure 5:
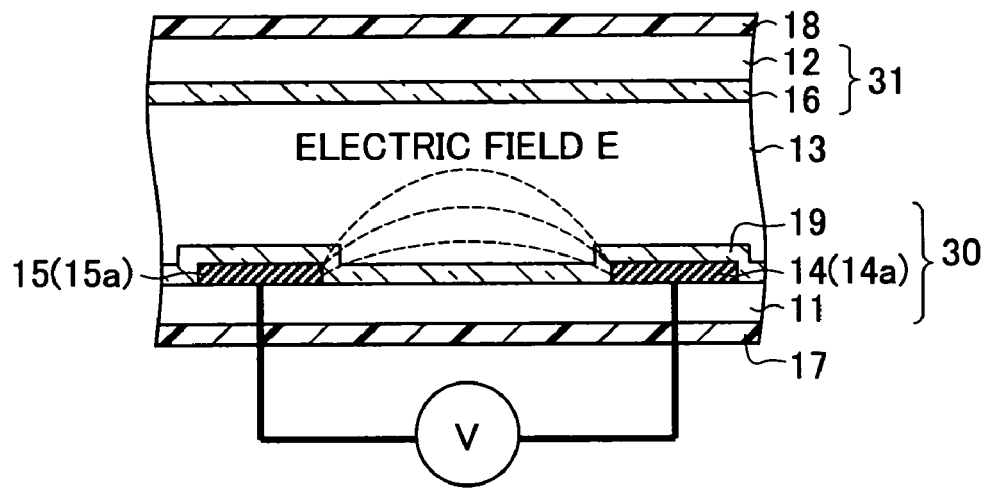
FIG. 5(a) is a cross-sectional view schematically illustrating a major portion of a conventional display element for comparison, when an electric field is applied (ON state).
FIG. 5(b) is a cross-sectional view schematically illustrating the major portion of display element of the present embodiment, when an electric field is applied (ON state).
Figure 5:
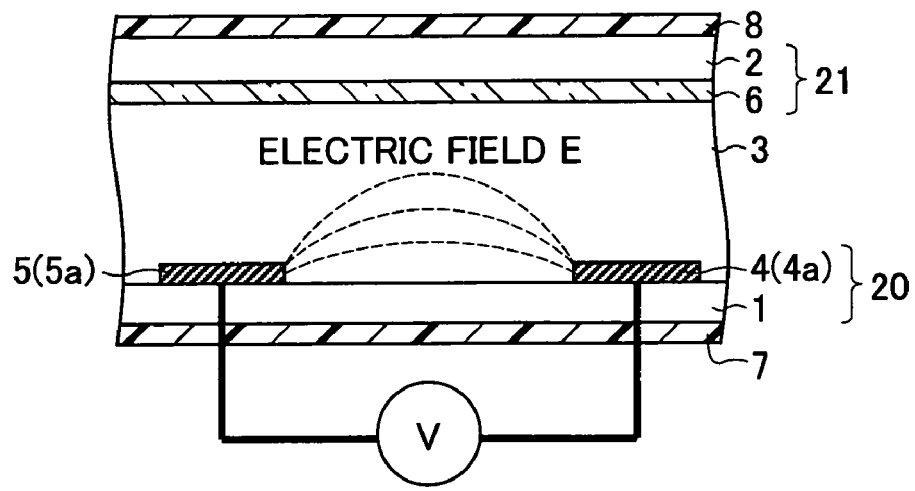

FIG. 3 is a graph showing the relation between the voltage to be applied and the transmittance, in the display element of FIGS. 1(a) and (b). FIGS. 4(a) to 4(g) are cross sectional views showing difference in display principle between the foregoing display element and a conventional display element, by schematically illustrating (i) shapes and main axis directions of average optical refractive index ellipsoid of the medium when no electric field is applied and when an electric field is applied. FIG. 4(a) is a cross sectional view illustrating the display element according to the present embodiment when no electric field is applied. FIG. 4(b) is a cross sectional view illustrating the display element according to the present embodiment when an electric field is applied. FIG. 4(c) is a cross sectional view illustrating a display element adopting the TN mode when no electric field is applied. FIG. 4(d) is a cross sectional view illustrating the display element adopting the TN mode when an electric field is applied. FIG. 4(e) is a cross sectional view illustrating a display element adopting the VA mode when no electric field is applied. FIG. 4(f) is a cross sectional view illustrating the display element adopting the VA mode when an electric field is applied. FIG. 4(g) is a cross sectional view illustrating a display element adopting the IPS mode when no electric field is applied.

Refractive index of a material is generally not isotropic and differs for each direction. The anisotropy of the refractive index (one example of optical anisotropy) is indicated by an ellipsoid (refractive index ellipsoid) (see Document 11, for example) represented in an arbitrary orthogonal coordinate system $(X_1, X_2, X_3)$ by the following Equation (1):

$$\sum_{ij}\left(\frac{1}{n_{ij}^2}\right)X_iX_j = 1 \qquad (1)$$

$(n_{ji}=n_{ij}, i, j=1,2,3)$ where x is a direction parallel to the surfaces of the substrates (substrate in-plane direction) and along a direction in which the electrodes 4 and 5 face each other, y is a direction parallel to the surfaces of the substrates (substrate in-plane direction) and perpendicular to the direction in which the electrodes 4 and 5 face each other, $$\frac{Y_1^2}{n_1^2} + \frac{Y_2^2}{n_2^2} + \frac{Y_3^3}{n_3^3} = 1 \qquad (2)$$

and z is a direction perpendicular to the surface of the substrates (substrate normal direction). Here, the Formula (2) below is modification of Formula (1), using the coordinate system $(Y_1, Y_2, Y_3)$ of the major axis direction of the ellipsoid.

In the formula, $n_1$, $n_2$, $n_3$ (hereinafter referred to as nx, ny, nz) are called principal refractive indexes which respectively correspond to half lengths of three axes of the ellipsoid. Here, looking at a light wave traveling (propagating) from an original point toward a direction perpendicular to a surface of $Y_3=0$, the light wave has polarization components in the directions of $Y_1$ and $Y_2$. The respective polarization components have refractive indices of nx and ny. In general assumption, a plane which passes through the original point and is perpendicular to the traveling direction of the light wave is the cross section of the refractive index ellipsoid with respect to the light traveling in a certain direction. The major axial direction of the ellipsoid is the polarization component direction of the polarized light of light wave. The half length of the major axis corresponds to the refractive index for the polarization component direction.

First, the difference in display principle between the display element, which carries out display using the change in optical anisotropy by electric field application, and the conventional liquid crystal display elements is discussed. The conventional liquid crystal display elements exemplified here are TN mode, VA mode, and IPS mode.

As illustrated in FIGS. 4(c) and 4(d), the conventional liquid crystal display element of the TN mode is arranged as follows: a liquid crystal layer 105 is sandwiched between a pair of opposed substrates 101 and 102. On the substrates 101 and 102, transparent electrodes (electrodes) 103 and 104 are respectively provided. When no electric field is applied, major axes of liquid crystal molecules are helically oriented in the liquid crystal layer 105. On the other hand, when the electric field is applied, the major axes of the liquid crystal molecules are oriented along an electric field direction. In this case, when no electric field is applied, an average refractive index ellipsoid 105a is oriented with its major axis parallel to the substrate surface (substrate in-plane direction), as illustrated in FIG. 4(c). When the electric field is applied, the major axis is oriented along the substrate normal direction, as illustrated in FIG. 4(d). That is, the refractive index ellipsoid 105a has an ellipsoidal shape regardless of whether the electric field is applied or not. However, the refractive index ellipsoid 105a changes direction of its major axis (principal axial direction, direction in which the refractive index ellipsoid 105a is headed) depending on whether the electric field is applied or not. That is, the refractive index ellipsoid 105a is rotated by electric field application. It should be noted that the shape and size of the refractive index ellipsoid 105a hardly changes by electric field application.

As illustrated in FIGS. 4(e) and 4(f), the conventional liquid crystal display element of VA mode is arranged as follows: a liquid crystal layer 205 is sandwiched between a pair of opposed substrates 201 and 202. On the substrates 201 and 202, transparent electrodes (electrodes) 203 and 204 are respectively provided. When no electric field is applied, major axes of liquid crystal molecules are oriented substantially perpendicular to the surface of substrate. When an electric field is applied, the major axes of the liquid crystal molecules are oriented along a direction perpendicular to an electric field. In this case, when no electric field is applied, an average refractive index ellipsoid 205a is oriented with its major axis lying along a substrate normal direction, as illustrated in FIG. 4(e). When the electric field is applied, the refractive index ellipsoid 205a is oriented with its major axis parallel to the substrate surface (substrate in-plane direction). That is, as with the liquid crystal display element of TN mode, the refractive index ellipsoid 205a has an ellipsoidal shape regardless of whether the electric field is applied or not also in the liquid crystal display element of VA mode, whereas the refractive index ellipsoid 205a changes the orientation of major axis (the refractive index ellipsoid 205a is rotated) depending on whether the electric field is applied or not. It should be noted that the shape and the size of the refractive index ellipsoid 205a hardly changes by electric field application.

As illustrated in FIGS. 4(g) and 4(h), the conventional liquid crystal display element of IPS mode is arranged so that, on a substrate 301, a pair of electrodes 302 and 303 are provided to be opposed to each other. A liquid crystal layer is sandwiched between the substrate 301 and a counter substrate (not shown), and an electric field (voltage) is applied to the liquid crystal layer from the electrodes 302 and 303. On this electric field application, the orientational order of liquid crystal molecules (major axial direction of a refractive index ellipsoid 305a) in the liquid crystal layer is changed. In this way, the display state is changed depending on whether an electric field is applied or not. That is, as with the liquid crystal display elements of TN mode and VA mode, the refractive index ellipsoid 305a hardly changes in shape and size depending on whether the electric field is applied (as illustrated in FIG. 4(g)) or not (as illustrated in FIG. 4(h)) also in the liquid crystal display element of IPS mode, whereas the direction of major axis of refractive index ellipsoid 305a changes (the refractive index ellipsoid 305a is rotated) depending on whether the electric field is applied or not.

As described above, the conventional liquid crystal display elements are arranged such that the liquid crystal molecules are orientated along a certain direction (one certain direction typically) even when no electric field is applied, and that display operation (modulation in transmittance) is carried out by changing the orientational order of all molecules together by applying the electric field (voltage). That is, in the conventional liquid crystal display element, display operation is carried out by utilizing rotation (change) of only the major axis (principal axis) of the refractive index ellipsoid, and the shape and size of the refractive index ellipsoid hardly changes (that is, the refractive index ellipsoid is kept in an ellipsoidal shape). Therefore, in the conventional liquid crystal display element, the major axial direction of the refractive index ellipsoid is not always perpendicular or parallel to the electric field application direction. In other words, in the conventional liquid crystal display element, the degree of orientational order of liquid crystal molecules is constant, and the display operation (modulation in transmittance) is carried out by changing the orientational order. That is, in the conventional liquid crystal display element, the application of electric field changes the direction of orientation easing axis, whereas the orientational order parameter is constant.

On the other hand, as illustrated in FIGS. 4(a) and 4(b), the display element of the present embodiment is arranged as follows: a refractive index ellipsoid 3a has a spherical shape when no electric field is applied, that is, the refractive index ellipsoid 3a is optically isotropic (nx=ny=nz; orientational order parameter in a scale not less than the wavelength of visible light≈0 (substantially 0)), and becomes optically anisotropic (nx>ny; orientational order parameter>0 in a scale not less than the wavelength of visible light) when the electric field is applied. When the optical anisotropy appears, the refractive index ellipsoid 3a becomes an ellipsoidal shape (exhibits optical anisotropy). Moreover the major axial direction of the refractive index ellipsoid 3a becomes perpendicular to the direction of electric field application. That is, when the dielectric anisotropy of the dielectric material is negative (negative type liquid crystal), the major axial direction of the refractive index ellipsoid 3a is perpendicular to the direction of electric field(perpendicular state) regardless of amount of electric field application. When the dielectric anisotropy of the dielectric material is positive (positive type liquid crystal), the major axis of the refractive index ellipsoid 3a is directed in parallel to the electric field direction (parallel state) regardless of amount of electric field application. In the present invention, the electric field application direction and at least one of the major axial directions of the refractive index ellipsoid 3a are always parallel or perpendicular to each other. Note that, in the technology disclosed herein, "the orientational order parameter≈0 in a scale not less than the wavelength of visible light (almost no orientational order)" indicates a specific condition such that a majority of the liquid crystal molecules or the like are orientated in a certain direction (there is an orientational order) when observed in a scale smaller than the wavelength of visible light, whereas, in the scale larger than the wavelength of visible light, the orientational directions of the molecules are averaged(that is, random) and there is no orientational order. Therefore, when the orientational order parameter is substantially 0 in a scale not less than the wavelength of visible light, the orientational order parameter is so small that it causes no effect on the light in the wavelength range of visible light or the light larger than the wavelength of visible light. This condition is equivalent to a state that, for example, the black display is carried out under crossed nicols (polarizers). Furthermore, in the present invention, "the orientational order parameter in a scale equal to or greater than the wavelength of the visible light>0" indicates an orientational order parameter greater than the orientational order parameter≈0. This condition is equivalent to a state that, for example, the white display (and/or gray display, which is gradation display) is performed under crossed nicols.

That is, the display element according to the present embodiment is arranged so that the molecules 9 are randomly aligned toward different directions when no electric field is applied. However, the molecules 9 are orientated in an order (orderly structure, orientational order) smaller than the wavelength of visible light (the orientational order parameter in the scale not smaller than the wavelength of the visible light≈0) and thus no optical anisotropy is caused. Therefore, the shape of the refractive index ellipsoid 3a is spherical as illustrated 4(a). When the electric field is applied, orientational state of the respective molecules 9 is changed because the respective molecules 9 attracted toward the in-plane direction of the substrates because of their negative dielectric anisotropy. Then, as the orientation state is changed, the optical anisotropy is exhibited (the orientational order parameter in a scale not smaller than the wavelength of the visible light>0) as a result of distortion occurred in the orderly structure smaller than the wavelength of visible light. As described above, the display element according to the present embodiment is arranged such that, when no electric field is applied, the refractive index ellipsoid 3a has a shape (nx=ny=nz) that causes optical isotropy, and when the electric field is applied, the refractive index ellipsoid 3a has a shape (nx>ny in the vicinity of the surface of the lower substrate (in FIG. 4(b), the substrate 1 located lower); and ny>nx in the vicinity of the surface of the upper substrate (in FIG. 5(b), the substrate 2 located upper)) that causes optical anisotropy, for example, as illustrated in FIG. 5(b). That is, the display element according to the present embodiment is arranged such that the shape and the size of the refractive index ellipsoid 3a is changeable by and according to the electric field applied thereon. Note that nx, ny, and nz are the principal refractive indices respectively with respect to the direction parallel to the substrate surface (substrate in-plane direction), the direction in which the pectination electrodes 4 and 5 face each other, the direction parallel to the substrate surface (substrate in-plane direction) and perpendicular to the direction in which the pectination electrodes 4 and 5 face each other, and the direction perpendicular to the substrate surface (substrate normal direction).

Figure 18:
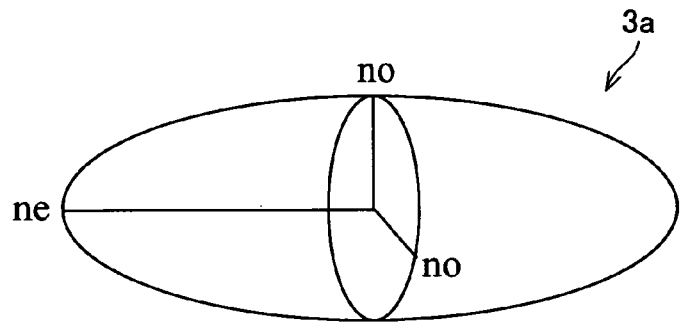
FIG. 18 is a schematic view illustrating a shape of a refractive index ellipsoid of a molecule of the display element illustrated in FIG. 1 when an electric field is applied.

Moreover, FIG. 18 is a schematic view illustrating the shape of the refractive index ellipsoid 3a of one of the molecules (molecules 9) of the medium A when the electric field is applied, in the display element illustrated in FIG. 1. As illustrated in FIG. 18, the shape of the refractive index ellipsoid 3a is indicated as a cross section of the refractive index ellipsoid (ellipsoid) taken along a plane passing through an original point and perpendicular to a propagation (traveling) direction of light wave. As described above, the major axial direction of the ellipsoid is equivalent to a component direction of the polarized light of the light wave, and a half of the length of the major axis corresponds to a refractive index along that direction.

The medium A according to the present embodiment is optically isotropic (in isotropic phase) when no electric field is applied, and becomes optically anisotropic when the electric field is applied thereon. That is, the shape of refractive index ellipsoid 3a is spherical, that is, being optically isotropic (in isotropic phase) when no electric field is applied, optical anisotropy is expressed in response to application of electric field.

As shown in FIG. 18, assume that ne expresses the refractive index along the major axial direction of the ellipsoid (that is, the component direction of the polarized light of the light wave) upon occurrence of the optical anisotropy in response to application of electric field, that is, the refractive index (irregular light refractive index) along the major axial direction of the molecule 9, and no expresses the refractive index along the direction perpendicular to the major axial direction of the ellipsoid, that is, the refractive index (normal light refractive index) along the minor axial direction of the molecule 9, the refractive index anisotropy (Δn) (change in birefringence) is expressed as follows:

$\Delta n = ne - no.$

That is, in the technology disclosed herein, the refractive index anisotropy (Δn) indicates the change in birefringence expressed as Δn=ne–no (ne: irregular light refractive index, no: normal light refractive index). ne and no are varied in the technology disclosed herein, but not varied in the conventional liquid crystal display device.

The major axis of the refractive index ellipsoid 3a is oriented in parallel to the electric field application direction on application of electric field (when the medium has positive dielectric anisotropy), or the major axis of the refractive index ellipsoid 3a is oriented perpendicular to the electric field application direction on application of electric field (when the medium has negative dielectric anisotropy).

On the other hand, in the conventional liquid crystal display element, the display operation is carried out by utilizing the rotation of the major axis of refractive index ellipsoid that is induced by the electric field application. Thus, in the conventional liquid crystal display element, the major axis of the refractive index ellipsoid is not always oriented to a parallel or perpendicular direction to the direction of electric field application.

As described above, the display element according to the present embodiment carries out the display operation by modulating/changing the orientational order parameter with a scale, for example at or greater than the wavelength of visible light. In the display operation of the display element according to the present embodiment, the direction of optical anisotropy is constant (the direction of electric field (voltage) application is not changed). That is, in the display element according to the present embodiment, the display operation is carried out by changing the degree of optical anisotropy (for example, orientational order in a scale not smaller than the wavelength of visible light) of medium A. Therefore, the display element according to the present embodiment is greatly different from the conventional liquid crystal display element in terms of display principle.

The medium A sealed in the medium layer 3 may be any medium provided that the degree of optical anisotropy is changeable by and according to application of electric field. For example, the medium A may be such a medium that it is substantially optically isotropic (the orientational order parameter in the scale not smaller than the wavelength of visible light≈0) when no electric field is applied, and causes optical modulation in response to application of electric field application (that is, the medium becomes optically anisotropic by electric field application). Otherwise, the medium A may be such a material (medium) that the orientational order parameter in the scale not smaller than the wavelength of visible light is increased among the molecules 9 or molecular agglomerations (clusters) by and according to application of electric field (it is further increased from a value of the orientational order parameter in a state where the optical modulation is already induced (the orientational order parameter in the scale not smaller than the wavelength of the visible light>0)).

As described above, in the technology disclosed herein, "change in degree of optical anisotropy of the medium A by and according to application of electric field" indicates a change in shape of the refractive index ellipsoid 3a by and according to application of electric field. In this arrangement in which the medium A is optically isotropic when no electric field is applied but causes a change in degree of optical anisotropy in response to application of electric field, in other words, becomes optical anisotropic in response to application of electric field, the shape of refractive index ellipsoid 3a is changed from a sphere into an ellipsoid.

As illustrated in FIG. 2(a), in the display element according to the present embodiment, the medium A sealed between the substrates 1 and 2 exhibits isotropic phase, that is optically isotropic when no electric field (voltage) is applied to the electrodes 4 and 5. Therefore, the display element shows black in the screen.

On the other hand, as illustrated in FIG. 2(b), when the electric field is applied across the interleave electrodes 4 and 5, the molecules 9 of the medium A are orientated with their major axes directed along the electric field generated in the interleave electrodes 4 and 5, thereby inducing birefringence.

As a result, the transmittance of display element is modulated in accordance with the voltage applied to the electrodes 4 and 5.

At a temperature far enough from the phase transition temperature (transition point), it is required to apply a large voltage to modulate the transmittance of display element; however, at a temperature right above the transition point, it is possible to modulate the transmittance sufficiently by applying a voltage approximately in a range of from 0V to 100V.

For example, according to Documents 7 and 11, the relation between the change in birefringence ($\Delta n = n// - n\perp$) and the external electric field (an electric field E (V/m)) are expressed by the following formula (3), where n// is a refractive index along the electric field direction and n⊥ is a refractive index along the direction perpendicular to the electric field direction. Note that $\lambda$ (m) is a wavelength of incident light in vacuum, $B_k$ is the Kerr constant (m/V$^2$), and E is strength of electric field application (electric field strength) (V/m).

$$\Delta n = \lambda \cdot B_k \cdot E^2 \quad (3)$$

It is known that, as the temperature (T) increases, the Kerr constant $B_k$ decreases as a function proportional to 1/(T−Tni). Though the driving can be performed with a weak electric field near the transition point (Tni), a much larger strength of electric field is required to perform the driving as the temperature (T) increases. Therefore, at a temperature far enough from the transition point (that is, at a temperature well above the transition point), a larger voltage is required to modulate the transmittance, whereas modulation of transmittance is ensured with a voltage of about 100V or less at a temperature right above the transition point.

Further, when the power is turned on in the display device using the display element which includes the medium A as a display medium for expressing optical anisotropy in response to electric field application, if the ambient temperature is low, the temperature of medium A does not reach the value at which the medium A can be driven, that is, the medium A does not have the necessary physical condition for driving. For example, assume that the medium A is supposed to be driven with the isotropic state at a temperature right above the Nematic-isotropic phase transition temperature (may be other way round in some cases), the temperature of medium A falls below the phase transition temperature, thus exhibiting Nematic phase. In this case, when no electric field is applied, that is, the medium A is supposed to be isotropic and with black display, the medium A may exhibit Nematic phase which has optical anisotropy even with no electric field application, thus transmitting light. Accordingly, the quality of black display decreases, thereby decreasing the contrast. Though it is possible to heat up the display element by a heater or a light source (backlight) to obtain desirable display, immediate rise and stabilizing of temperature is obviously not easy.

When the display element of the present embodiment is turned on at a temperature lower than the phase transition temperature where the medium A is not heated up enough for driving, the molecules of the exhibited Nematic phase are aligned in the alignment (operation) direction according to the alignment film 6. Here, as shown in FIG. 6, which is explained later, in the case of a horizontal alignment film, the molecules are aligned toward the absorption axis of the polarizer, in the case of vertical alignment film, the molecules are aligned perpendicularly to the surface of the polarizer, the medium A has no optical contribution, as it exhibits Nematic phase, that is, it has different physical condition to that for allowing driving. On this account, the display element performs desirable black display even before the temperature of the display element sufficiently rises by a heater or a backlight.

More specifically, according to the present embodiment, even though the medium is optically anisotropic when no electric field is applied, the optical contribution of the medium can be cancelled by either rubbing the one of surfaces of the pixel substrate 20 which faces the counter substrate 21 to orient the molecules toward the direction parallel or orthogonal to one of the absorption axis so as to set the direction of optical anisotropy, that is the direction of alignment to be parallel or orthogonal to said absorption axis of the polarizer, or perpendicularly rubbing the surface so as to align the molecules toward the perpendicular direction to the surface of the polarizer. That is, in the present embodiment, the surface of the pixel substrate 20 which is opposite the counter substrate 21 is horizontally or perpendicularly rubbed, and therefore the medium A, more specifically, the molecules constituting the medium A, are aligned according to the rubbing (alignment process) at a temperature lower than that where the display element is driven.

Further, when the display element of the present embodiment reaches the target driving temperature range, there was no light leakage on black display due to adherence of molecules to the surface boundary, and the display element achieves high contrast. As a result, high-speed response and superior viewing angle are obtained in the display element without decreasing the contrast.

In the conventional display element, the alignment film is provided on both of the pair of substrates by being formed on the respective surfaces in contact with the medium. With this arrangement, since the voltage applied to the medium is also supplied to the alignment film, the amount of voltage given to the medium is reduced. As a result, in the conventional display device, the effect of reduction of driving voltage is offset by the decrease in voltage application.

However, in the display element according to the present embodiment, as shown in FIGS. 1(a) and 1(b), the horizontal/vertical alignment is given only on a surface, that is the surface facing the substrate 2 (counter substrate 21), of the substrate (pixel substrate 20) 1. More specifically, the alignment film is not formed on the substrate 1 on which the electrodes 4 and 5 are formed. Therefore, in the display element according to the present embodiment, voltage application to the electrodes 4 and 5 is not performed via the alignment film. Therefore, in the present embodiment, the decrease in voltage amount applied to the medium A does not occur, thus securely reducing the driving voltage.

With reference to FIGS. 5(a) and 5(b), the following explains a result of comparison in driving voltage between the display element of the present embodiment and a conventional display element.

FIG. 5(a) is a plan view schematically illustrating a major part of structure of the display element according to the present embodiment when an electric field is applied (ON state). FIG. 5(b) is a plan view schematically illustrating a major part of structure of display element when an electric field is applied (ON state). Note that, since the major structure of the display element of the present embodiment shown in FIG. 5(b) is identical to that in FIG. 1(b), explanation thereof is omitted here.

As shown in FIG. 5(a), in the conventional display element for comparison, both of the substrates 11 and 12 (the pixel substrate 30 and the counter substrate 31) are provided with alignment films 16 and 19, respectively, in addition to rubbing treatment. That is, the alignment film 19 is formed also on the electrodes 14 and 15 provided on the pixel substrate 30, given a horizontal alignment. When the medium mixture is kept at a temperature right above the Nematic-isotropic phase transition temperature (the temperature slightly above the phase transition temperature, for example, +0.1 K) by an external heating device (heating means), the maximum transmittance was obtained at about a voltage of 63V.

On the other hand, when medium mixture of the display element according to the present embodiment, which is shown in FIG. 5(b), is kept at a temperature right above the Nematic-isotropic phase transition temperature (the temperature slightly above the phase transition temperature, for example, +0.1 K) by an external heating device (heating means), the maximum transmittance was obtained at about a voltage of 59V.

As described, in the display element according to the present embodiment in which the alignment film is not formed on the electrode, the voltage for obtaining the maximum transmittance is significantly decreased compared to the conventional display element in which the alignment film is formed on the electrode.

When the medium A is supplied with a specific strength of electric field, the molecules of the medium A in the vicinity of the substrate boundary having been rubbed for alignment are more easily aligned because of influence of rubbing on the substrate boundary. However, as shown in FIG. 5(a), when the alignment film 19 is applied to the substrate 11 where the electrodes 14 and 15 are formed, in other words, when the alignment film 19 is applied onto the electrodes 14 and 15, the voltage is also applied to the alignment film 19, and therefore the voltage applied to the medium A for performing optical modulation decreases. On this account, when the alignment film 19 is applied onto the electrodes 14 and 15, a greater voltage is required.

Therefore, in consideration of voltage decrease due to the alignment film 19 of FIG. 5(a), and of alignment effect of the molecules in the vicinity of the substrate boundary by the alignment treatment, the alignment treatment is preferably performed only for the substrate not containing electrodes.

In the conventional display element of FIG. 5(a), the alignment treatment of substrates 11 and 12 are performed by applying the alignment films 16 and 19 onto their respective opposed surfaces. In this arrangement, the voltage is applied also to the alignment film 19, and therefore the amount of voltage supplied to the medium layer 13 for optical modulation, thereby offsetting the effect of reduction in driving voltage. On the other hand, in the display element of the present embodiment shown in FIG. 5(b), the alignment treatment is carried out only for the substrate (substrate 2) not subjected to electric field application, thereby effectively reducing driving voltage.

The electrodes 4 and 5 formed on the substrate 1 are supplied with voltages from two directions. With this arrangement with two-direction electric field application, there exist two types of medium domains with different optical anisotropies (optically anisotropies with different directions) in the medium A of the medium layer 3. On this account, the viewing angle characteristic of the display element increases. Further, when these two paths of electric field application from the electrodes 4 and 5 are orthogonal to each other (forming an angle of 90°), there are two types of medium domains with two optical anisotropies whose directions are orthogonal to each other (forming an angle of 90°) in the medium A of the medium layer 3. Therefore, this display element is capable of compensating the coloring in the oblique viewing angle, because the two medium domains correct the coloring each other. With this arrangement, it is possible to provide a display element with a superior viewing angle characteristic without decreasing the transmittance. Further, by setting the absorption axes 7a and 8a of the polarizers 7 and 8 with a 45° angle therebetween, in addition to arranging the medium A with two orthogonal optical anisotropies, the compensation of the coloring in the oblique viewing angle is further ensured, thereby obtaining a display element with a further superior viewing angle characteristic.

One example of electrode supplying two-directional electric field may be a pectination electrode made up of two cuneatic comb-like teeth sections 4a and 5a, which are oppositely disposed to mesh with each other. Here, "cuneatic shape" means one state of comb teeth section in which each tooth is bent with a predetermined angle (saw tooth angle α). Further, as shown in FIG. 6, the comb teeth sections 4a and 5a may each include a plurality of cuneatic portions, forming a saw-like state. FIG. 6 is an explanatory diagram illustrating a relation between the arrangement of electrode and the absorption axis of polarizers, in the display element according to the present embodiment.

Figure 7:
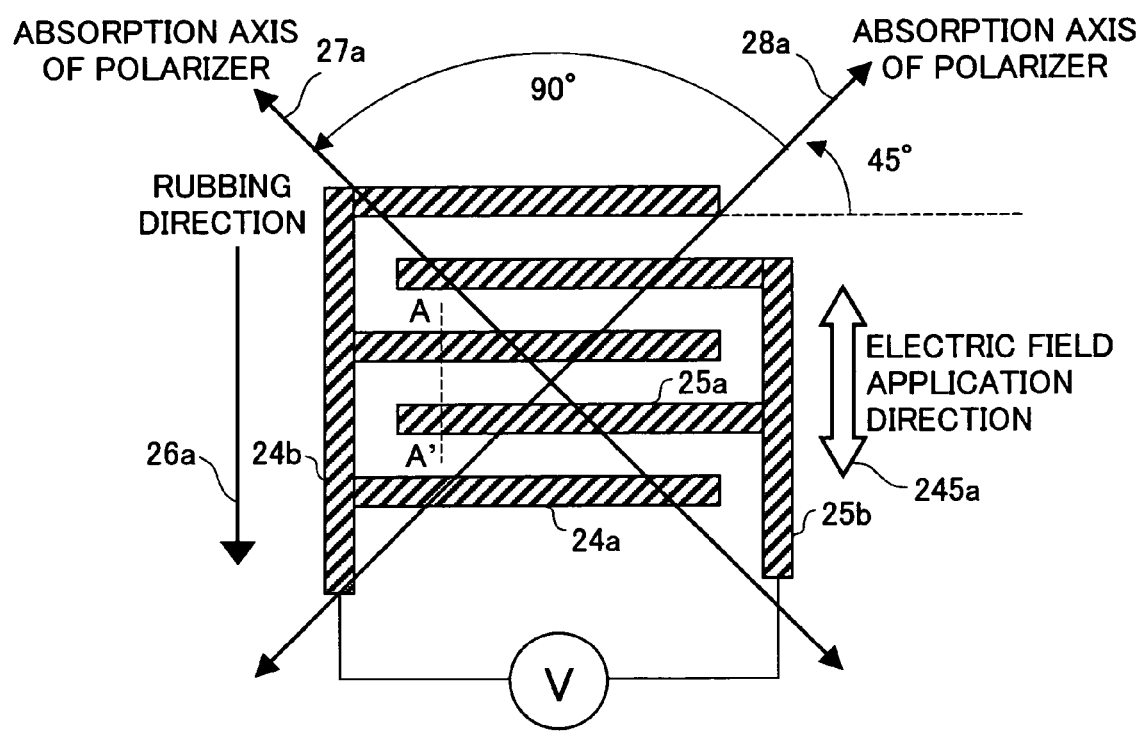
FIG. 7 is an explanatory diagram illustrating a relation between the arrangement of electrode and the absorption axis of polarizers, in the display element according to another example embodiment.

The "pectination electrode" here means a type of electrode in which an electrode (the root of comb) 4b or 24b has a teeth-electrode section 4a or 24a in which a plurality of teeth extend along a predetermined direction of the longitudinal direction, as shown in FIG. 6 or 7. Further, the "saw-like shape" refers to a state of comb-teeth section where each tooth extends with some alternate corners, which make the saw teeth angle α, toward the direction away from the longitudinal direction of the comb-root 4b or 24b.

One example of such a saw-shaped electrode may be electrodes 4 and 5 shown in FIG. 6. As shown therein, the electrode 4 is made up of comb-root section 4b and comb-teeth section 4a. Each tooth of comb-teeth section 4a extends with some alternate corners toward the direction away from the longitudinal direction of the comb-root 4b. Further, the comb-teeth section 4a is made up of some continuous saw tooth units 4e each constituted of saw tooth components 4c and 4d, which together create the saw teeth angle α. In the electrode 4, the comb-teeth section 4a extends with some alternate corners at the same interval toward the direction away from the longitudinal direction of the comb-root 4b.

Further, as with the comb-teeth section 4a of the electrode 4, the comb-teeth section 5a in the electrode 5 is also made up of some continuous saw tooth units 5e each constituted of saw tooth components 5c and 5d, which together create the saw teeth angle α.

Further, as shown in FIG. 6, the electrodes 4 and 5 are oppositely disposed so that their comb-tooth sections 4a and 5a mesh with each other. More specifically, in electrodes 4 and 5, the saw tooth components 4c and 4d of the comb-teeth section 4a are parallel to the saw tooth components 5c and 5d of the comb-teeth section 5a. Therefore, when an voltage is applied to the electrodes 4 and 5, two electric fields to be applied to different directions are formed, an electric field (the electric field application direction 45c of FIG. 6) between the saw tooth components 4c and the saw tooth components 5c, and an electric field (the electric field application direction 45d of FIG. 6) between the saw tooth components 4d and the saw tooth components 5d.

Further, the shape of the saw tooth units 4e and the saw tooth units 5e may be expressed as a chevron shape. Accordingly, the saw tooth shape above may be expressed as a state in which the chevron portion, that is the saw tooth unit, extends toward the direction away from the longitudinal direction of the comb-root. Further, the "comb-teeth section having a saw tooth shape" may be alternately expressed as a comb-teeth section with chevron portions forming a zigzag line.

Further, the shape of the saw tooth units 4e and the saw tooth units 5e may be expressed as a "V" shape. Accordingly, the saw tooth shape above may be expressed as a state in which the V-shape portion, that is the saw tooth unit, extends toward the direction away from the longitudinal direction of the comb-root. Further, the "comb-teeth section having a saw tooth shape" may be alternately expressed as a comb-teeth section with V-shape portions forming a zigzag line.

Further, as shown in FIG. 6, the electric field application direction 45c and the electric field application direction 45d are perpendicular to each other. Therefore, in the medium A, there are two types of medium domains with two optical anisotropies whose directions are orthogonal to each other (forming an angle of 90°). With this arrangement, the display element is capable of compensating the coloring in the oblique viewing angle, because the two medium domains correct the coloring each other.

Further, as shown in FIG. 1(b), the medium layer 3 can function as a shutter-type display element in which the optical anisotropy is expressed (the magnitude of the optical anisotropy varies) with a rise in orientational order parameter in the electric field application direction, thereby changing transmittance. Therefore, the maximal transmittance is obtained when the anisotropy direction is at an angle of 45° with respect to polarizer absorption axes which are orthogonal with each other. Note that, when a direction in which the optical anisotropy of the medium A is expressed is at an angle of ±θ (° C.) with respect to the polarizer absorption axes, the transmittance (P) is estimated according to a formula: $P(\%) = \sin 2(2\theta)$. For example, when an angle θ is 45°, the transmittance is 100%. Since a transmittance of 90% or more is the maximal luminance for human eyes, the maximum visible luminance for human eyes is obtained when θ=35°<θ<55°. More specifically, in the present embodiment, when the display element is supplied with an electric field substantially parallel to the substrate 1 for example, the display element is preferably arranged such that the electric field application direction 45c and the electric field application direction 45d respectively form angles of approximately 45° (an angle of 45° with a gain or loss of less than 10°, more preferably an angle of 45° with a gain or loss of not more than 5°, further preferably 45°) with the absorption axes 7a and 8a of the polarizers 7 and 8, and the electric field application toward the electric field application direction 45c and the electric field application direction 45d generates two optical anisotropies whose directions are orthogonal to each other forming an angle of approximately 90° (in a range of 90°±20°, more preferably in a range of 90°±10°, further preferably 90°).

Further, in the present embodiment, the electric field application directions 45c and 45d of the electrodes 4 and 5 preferably form an angle of 0° to 45° with respect to the alignment direction of the alignment film 6.

As described, the display element of the present embodiment is arranged so that the electric field application directions 45c and 45d of the electrodes 4 and 5 form an angle of 0° to 45° with respect to the alignment direction of the alignment film 6. With this arrangement, in the medium layer 3, the alignment film 6 has a superior alignment in the horizontal direction. Therefore, at a temperature right above the phase transition temperature, the Kerr constant Bk according to the foregoing formula (3) increases (that is, the Kerr effect becomes more significant). Further, the increase of Kerr effect allows reduction of the voltage applied to the display element for driving, allowing the display element to be used as a product with less driving voltage. On the other hand, when the angle created by the electric field application directions 45c and 45d of the electrodes 4 and 5 is larger than 45° with respect to the alignment direction of the alignment film 6, the Kerr constant decreases, and the reduction in driving voltage cannot be realized.

Accordingly, by arranging the electric field application directions 45c and 45d of the electrodes 4 and 5 to form an angle of 0° to 45° with respect to the alignment direction of the alignment film 6, it is possible to realize a display element with reduction in driving voltage, that is achieved by an increase of the Kerr constant Bk, and an improved viewing angle characteristic.

Further, in the display element according to the present embodiment, the foregoing increase of Kerr constant Bk (increase of the Kerr effect) becomes maximum when the electric field application directions 45c and 45d of the electrodes 4 and 5 is substantially identical to the horizontal alignment direction of the alignment film 6 (the angle created by the electric field application directions of the electrodes 4 and 5, and the alignment direction of the alignment film 6 is 0°).

As shown in FIG. 6, in the present embodiment, the rubbing direction 6a is identical to one of the absorption axes of the polarizers 7 and 8.

Further, as shown in FIG. 6, in the present embodiment, the polarizers 7 and 8 provided respectively on the substrates 1 and 2 are arranged so that their absorption axes are orthogonal to each other and respectively form angles of 45° with the electric field application directions 45c and 45d of the electrodes 4 and 5.

Therefore, in the present embodiment, as shown in FIG. 6, the electric field application directions 45c and 45d of the electrodes 4 and 5 respectively form angles of 45° with the absorption axes 7a and 8a of the polarizers 7 and 8, and with the rubbing direction 6a of the alignment film 6.

Figure 16:
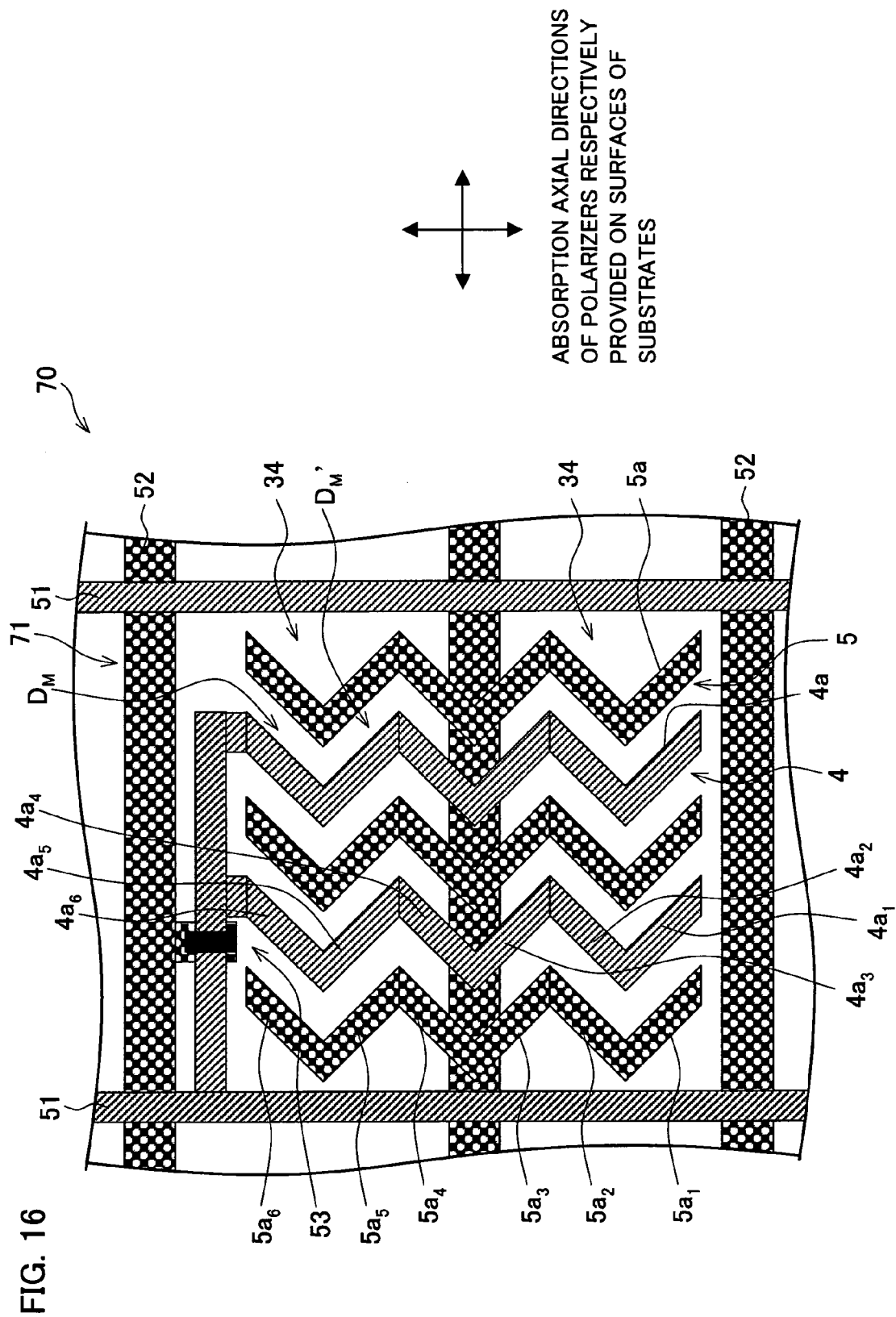
FIG. 16 is a plan view schematically illustrating an example of an electrode configuration of each pixel of the display element according to the present embodiment.
Figure 17:
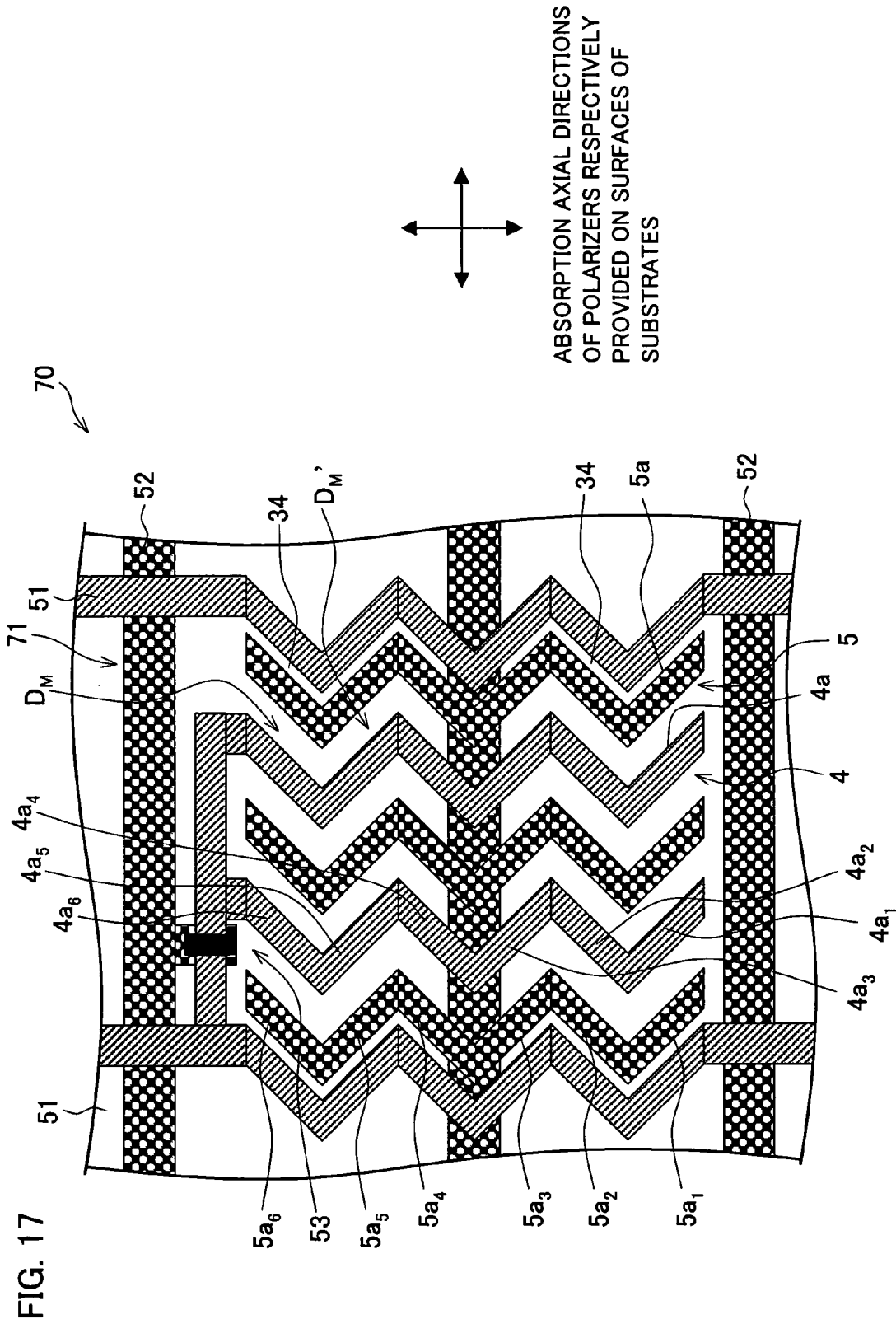
FIG. 17 is a plan view schematically illustrating an example of an electrode configuration of each pixel of a yet another example embodiment.

With reference to FIGS. 16 and 17, one embodiment using matrix pixel groups formed of switching elements, signal lines, scanning lines, and counter electrode lines are explained below. FIGS. 16 and 17 are plan views each schematically illustrating an example of an electrode configuration of a pixel of display element according to the present embodiment.

The display element 70 according to the present embodiment is so arranged that, as illustrated in FIGS. 16 and 17, data signal lines 51 (SLv) and scanning signal lines 52 (GLw) are provided respectively corresponding to each column and row of a plurality of pixels 71 arranged in matrix, and a pixel electrode (pectination electrode 4) having a comb-like shape and a counter electrode (pectination electrode 5) having a comb-like shape are provided in each pixel 71. More specifically, the display element 70 according to the present embodiment includes: a plurality of data signal lines 51 and a plurality of the scanning signal lines 32, the data signal lines 51 and scanning signal lines 52 arranged in matrix; at least one TFT 53 (switching element) provided corresponding to each intersection between the data signal lines 51 and the scanning signal lines 52; the pectination electrode 4, which is a pixel electrode (i) having a comb-like shape having tooth portions 4a and (ii) connected to the TFT; the pectination electrode 5, which is a counter electrode having a comb-like shape having comb-teeth sections 5a which mesh with the tooth portions 4a, the comb-teeth sections 4a and 5a bent at an angle (bending angle) of 90° forming a zigzag shape (V-like shape (chevron shape)) in planes substantial parallel to the substrates 1 and 2, in order to form, in each pixel 71, at least two domains $D_M$ and $D_M'$ in which two-directional electric fields, which create 90° angle therebetween, are respectively applied by the pectination electrodes 4 and 5.

With this arrangement, in the present embodiment, the comb-teeth portions 4a and 5a are bent at an angle of 90°, and are disposed oppositely to mesh with each other. Therefore, at least two domains $D_M$ and $D_M'$ (microdomains) are formed between the comb-teeth sections 4a and 5a. These two domains $D_M$ and $D_M'$ are supplied with electric fields those directions are orthogonal to each other.

More specifically, the display element 70 according to the present embodiment is so arranged that each comb-teeth portion 4a and 5a has segment portions (saw-tooth section) $4a_1$, $4a_2$, ... $4a_r$ or $5a_1$, $5a_2$, $5a_r$ (r is an arbitrary integer indicating a number of optical anisotropy generated by the application of electric field). Further, in each pixel, there are at least two domains $D_M$ and $D_M'$ in which segment portions make an angle of substantially 90° with adjacent segment portions respectively.

Note that the display element 70 according to the present embodiment is also arranged such that polarizers 6 and 7 are so provided respectively on outer surfaces of the substrates 1 and 2, and their absorption axes 7a and 8a are orthogonal to each other. The absorption axes 7a and 8a of the polarizers 7 and 8 make and angle of 45° with respect to extension direction of the comb-teeth portions 4a and 5a of the pectination electrodes 4 and 5, that is, directions in which the segment portions are stretched out. With this arrangement, the polarizers 7 and 8 are so arranged that their absorption axes 7a and 8a respectively make an angle of 45° with respect to a direction of electric field application by the segment sections $4a_r$ and $5a_r$.

The inventors found that this arrangement also allows to provide another display element 70 with a wider view angle and less coloring phenomenon in all directions, without deteriorating the transmittance.

In the electrode configuration illustrated in FIG. 16, there is a large non-display region 34 (which does not contributes to the display) between the data signal line 51 and the counter electrode in the pixel 51, that is, between the data signal line 51 and the pectination electrode 5 which faces the data signal line 51.

In view of this, in the arrangement illustrated in FIG. 17, the data signal line 31 is not linear but bent in parallel to the zigzag shape of the pectination electrodes 4 and 5 in the pixel 71. On this account, the non-display region 34 is significantly reduced.

In the configuration of FIG. 16, the display contributing region (which contributes to the display) is about 30%. However, the display contributing region is improved to 40% in the configuration illustrated in FIG. 17.

The present invention is not limited to the structure in which the comb-teeth portions 4a and 5a of the pectination electrodes 4 and 5 are provided along the data signal lines 51, and the data signal lines 51 have the zigzag shape along the comb-teeth portions 4a and 5a. For example, the comb-teeth portions 4a and 5a may be extended along the scanning signal lines 52; also, it is allowable to form only one of data signal lines 51 or the scanning lines 52 into the zigzag shape.

Moreover, in the present embodiment, it is preferable that the directions of the optical anisotropies occurred in the respective domains $D_M$ and $D_M'$ when the electric field is applied make about 45° (preferably an angle of 45° with a gain or loss of not more than 10°, more preferably an angle of 45° with a gain or loss of less than 10°, and further preferably an angle of 45° with a gain or loss of not more than 5°) with the absorption axes of the polarizers 7 and 8. Further, it is preferable that the directions of the optical anisotropies occurred in the respective domains $D_M$ and $D_M'$ when the electric field is applied make, therebetween, about 90° (preferably an angle of 90° with a gain or loss of not more than 20°, more preferably an angle of 90° with a gain or loss of less than 20°, and further preferably an angle of 90° with a gain or loss of not more than 10°).

That is, as described, when $\theta=35°\leq\theta\leq55°$, particularly when $\theta=35°<\theta<55°$, with respect to the absorption axis of the polarizer, there is no significant difference in visible luminance. Therefore, as for compensation of the coloring phenomenon, if the domains only have a difference of around 10% in luminance, there will be no significant difference in their visible luminances, and the effect of compensation works sufficiently in practical use. Accordingly, the anisotropies of the domains (e.g., domains $D_M$ am $D_M'$) are preferably directed by forming an angle of 90° with a gain or loss of not more than 20° (that is from 70° to 110°), more preferably an angle of 90° with a gain or loss of less than 20° (that is greater than 70° but less than 110°), further preferably an angle of 90° with a gain or loss of not more than 10° (that is from 80° to 100°), and most preferably at 90°.

Further, in the present embodiment, a ratio between the respective domains DM and DM' in the pixel 71 is preferably decided as follows: a ratio between two domains $D_M$ and $D_M'$ in which the optical anisotropies of different directions occurs (that is, a ratio between sums of areas of the domains) is 1:9 to 1:1 (more preferably 1:1). When the ration is in a range of 1:9-1:1, the visible effect of color correction (compensation) becomes most significant.

The color change in a range of a polar angle of ±60° (the range of color change (the change in chromaticity coordinates denoted by a chromaticity coordinates distance=$\sqrt{\{\Delta x^2 + \Delta y^2\}}$) when viewing an image at different angles) was measured, with the result that the color change (chromaticity coordinates distance) is halved when domains DM and DM', a ratio of 1:1, with 90° difference in direction of optical anisotropy, are created, compared to the case not providing small domains. Further, the color change becomes smaller as the ratio of domain decreases from 1:9 to 1:1, and becomes the smallest when 1:1, this is therefore most preferable.

Figure 19:
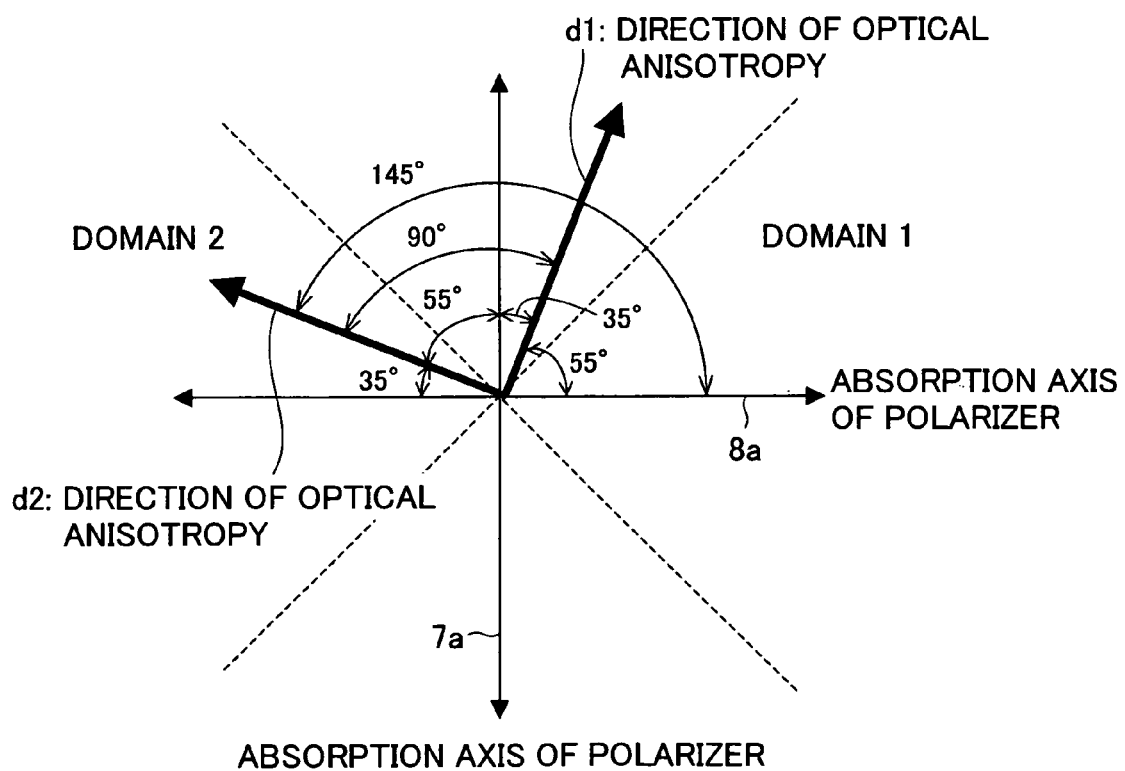
FIG. 19 is an explanatory view illustrating respective angles between the domains of pixels, and an angle between the direction of optical anisotropy which occurs in each domain in response to electric field application, and the absorption axis of each polarizer.
Figure 20:
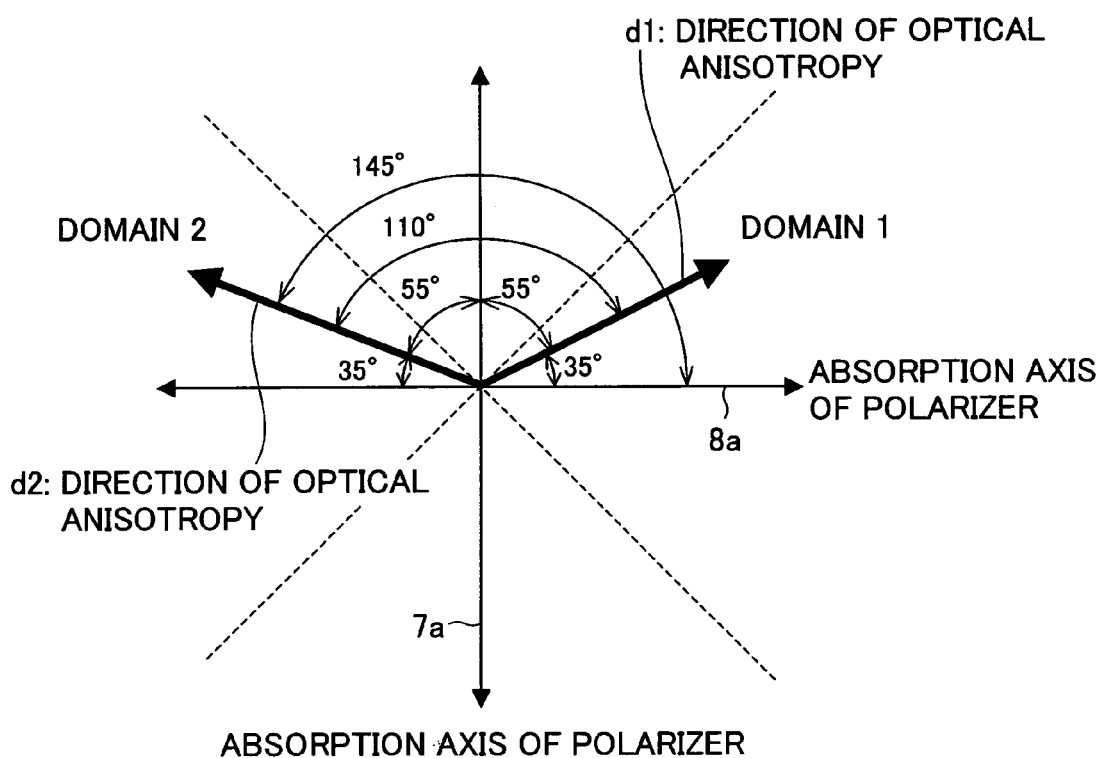
FIG. 20 is an explanatory view illustrating respective angles between the domains of pixels, and an angle between the direction of optical anisotropy which occurs in each domain in response to electric field application, and the absorption axis of each polarizer.
Figure 21:
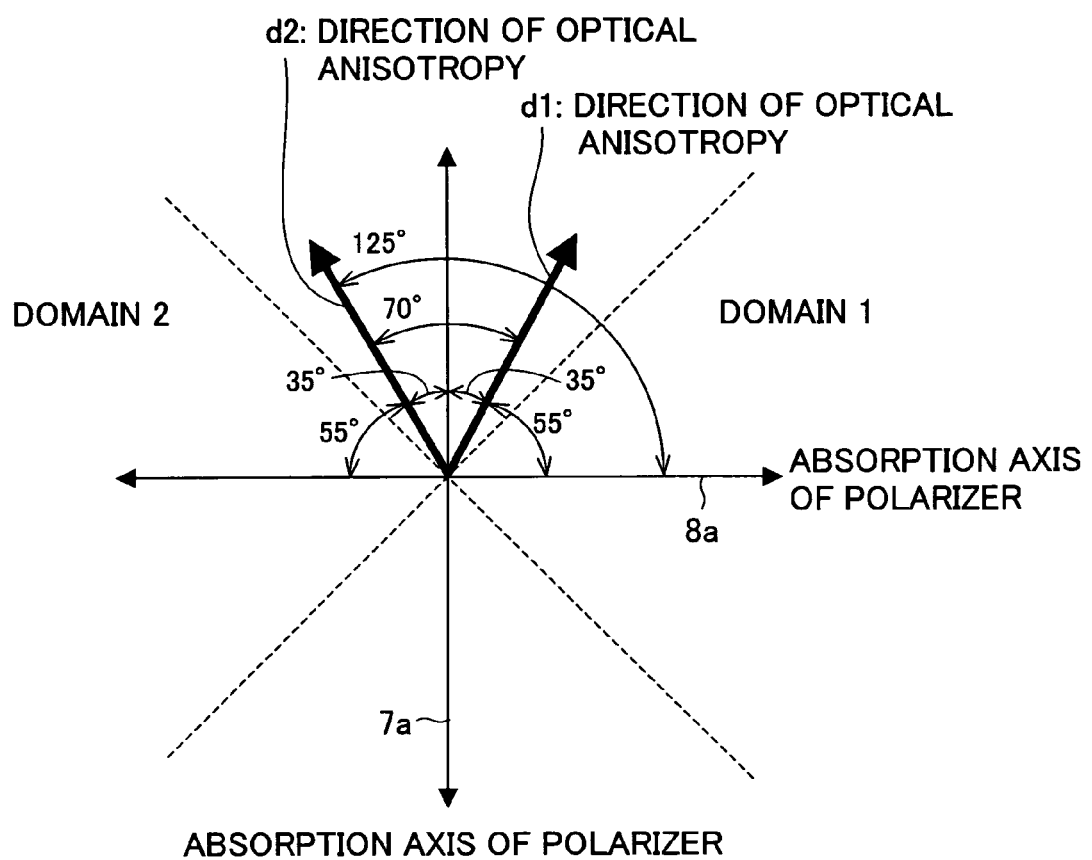
FIG. 21 is an explanatory view illustrating respective angles between the domains of pixels, and an angle between the direction of optical anisotropy which occurs in each domain in response to electric field application, and the absorption axis of each polarizer.

Moreover, the present invention is not limited to the arrangement which is mainly discussed above in which each pixel 71 has two types of domains. For example, the pixel 71 may have two domains with optical anisotropies having the same direction. More specifically, the present invention may be arranged such that more than two types of domains are provided which express optical anisotropies of the same direction. More specifically, as described above, it is preferable that the directions of optical anisotropies occurred in the respective domains when the electric field is applied or when no electric field is applied make about 45° (45°±10°) with respect to the absorption axes 6a and 7a of the polarizers 6 and 7, and that the directions of the optical anisotropies occurred in the respective domains when the electric field is applied or when no electric field is applied create an angle of about 90° (90°±20°). For example, as shown in FIGS. 19 to 21, the angles may be varied from 45 degrees or 90 degrees. That is, as understood from the above description, the optical anisotropies of the medium A in the pixel 71 does not always have two directions, provided that each pixel includes at least two domains $D_M$ and $D_M'$ generating two optical anisotropies of different directions when the electric field is applied or when no electric field is applied.

As described, the technology disclosed herein is arranged such that: in each pixel 71, there are at least two domains $D_M$ and $D_M'$ in which, when the electric field is applied or when no electric field is applied, the medium A shows optical anisotropies having different directions respectively; (a) the directions of the optical anisotropies generated in the respective domains $D_M$ and $D_M'$ when the electric field is applied thereon and (b) the absorption axes 7a and 8a of the polarizers 7 and 8 respectively form angles of, as described above, 45° with a gain or loss of not more than 10°, more preferably an angle of 45° with a gain or loss of less than 10°; and the directions of the optical anisotropies generated in the respective domains $D_M$ and $D_M{}'$ when the electric field is applied or when no electric field is applied thereon make an angle of 90° with a gain or loss of not more than 20°, more preferably an angle of 90° with a gain or loss of less than 20°. With this arrangement, the coloring phenomenon occurred in the respective domains when viewed from an oblique direction can be cancelled (compensate for) by each other. Therefore, it is possible to largely improve the viewing angle characteristic without deteriorating the transmittance.

Further, the present embodiment provides a display element requiring less driving voltage with an arrangement comprising: a display element including two substrates 1 and 2; a medium layer 3 held between the substrates 1 and 2; electrodes 4 and 5 for applying an electric field to the medium layer 3 in a direction parallel to the substrate 1 so as to cause optical modulation of the medium layer 3, wherein the substrate 2 includes an alignment film 6 on one of the surfaces which gives horizontal alignment effect; further, since the electrodes 4 and 5 apply electric field toward two directions, the display element has a superior viewing angle characteristic. Further, the display device 60 according to the technology disclosed herein includes the display element 70 of the present invention, thereby improving the viewing angle characteristic.

Second Embodiment

The following will explain another example embodiment with reference to FIG. 7. The following embodiment basically explains only the difference from First Embodiment. For ease of explanation, materials having the equivalent functions as those shown in the drawings pertaining to First Embodiment above will be given the same reference symbols, and explanation thereof will be omitted here.

As with First Embodiment above, in the display element according to the present embodiment, there is no alignment film on the substrate 1 where the electrodes 24 and 25 are formed. Therefore, in the display element of the present embodiment, voltage application from the electrodes 24 and 25 to the medium A in the medium layer 3 is not performed via the alignment film. Therefore, in the display element of the present embodiment, the voltage amount applied to the medium A does not decrease, thereby achieving significant reduction in driving voltage.

In First Embodiment, at least one of the pair of substrates includes saw-teeth shaped pectination electrodes (electric field applying means). However, in the present embodiment, the electric field applying means, that is the pectination electrodes provided on at least one of the substrates, applies electric field in the same direction as the rubbing direction. FIG. 7 is an explanatory diagram illustrating a relation between the arrangement of electrode and the absorption axis of polarizers, in the display element according to the present embodiment.

As shown in FIG. 7, the structure of the present example embodiment is the same as that of First Embodiment except for the relation between the arrangement of electrode and the absorption axis of polarizers.

As shown in FIG. 7, the electrode 24 is made up of comb-root section 24b and comb-teeth section 24a. Each tooth of comb-teeth section 24a extends with some alternate corners toward the perpendicular direction to the longitudinal direction of the comb-root 24b. In the electrodes 24 and 25 according to the present embodiment, the comb-teeth section 24a and the comb-teeth section 25a are disposed in parallel with each other. Therefore, voltage application to the electrodes 24 and 25 induces an electric field in the perpendicular direction to the longitudinal direction of the comb-teeth sections 24a and 25a. Therefore, in the display element of the present embodiment, the electric filed is generated only in one direction (electric field application direction 245a in FIG. 7), between the comb-teeth section 24a and the comb-teeth section 25a.

Further, as shown in FIG. 7, the alignment film 26 of the display element according to the present embodiment is rubbed in a direction, which creates angles of 45° respectively with the absorption axes 27a and 28a of the polarizers 27 and 28. This rubbing (denoted by 26a in FIG. 7) is horizontally performed (horizontal rubbing) in the substrate in-plane direction.

Further, as shown in FIG. 7, in the present embodiment, the polarizers 7 and 8 provided respectively on the substrates 1 and 2 are arranged so that their absorption axes are orthogonal to each other and respectively form angles of 45° with the electric field application direction 245a of the electrodes 24 and 25.

In the display element of the present embodiment, the substrate surface is aligned by being provided with the alignment film 26, which gives a superior alignment to the medium layer in the horizontal direction. Therefore, at a temperature right above the phase transition temperature, the Kerr constant Bk according to the foregoing formula (3) increases (that is, the Kerr effect becomes more significant). Further, the increase of Kerr effect allows reduction of the voltage applied to the display element for driving, allowing the display element to be used as a product with less driving voltage.

Further, in the display element according to the present embodiment, the foregoing increase of Kerr constant Bk (increase of the Kerr effect) occurs when the electric field application direction 245a of the electrodes 24 and 25 and the horizontal alignment direction of the alignment film 6 form an angle of 0-45°. The increase amount becomes maximum when the electric field application direction 245a of the electrodes 24 and 25 is substantially identical to the horizontal alignment direction of the alignment film 26 (the angle created by the electric field application direction of the electrodes 24 and 25, and the alignment direction of the alignment film 6 is 0°).

Further, as described above, the display device according to the present embodiment achieves the maximum transmittance when the absorption axis of polarizer and the electric field application direction 245a of the electrodes 24 and 25 create an angle of about 45° (preferably an angle of 45° with a gain or loss of not more than 10°, more preferably an angle of 45° with a gain or loss of not more than 5°, and further preferably 45°).

Further, as shown in FIG. 7, in the present embodiment, the polarizers 27 and 28 are arranged so that their absorption axes are orthogonal to each other and respectively form angles of 45° with the direction where the comb-teeth sections 24a and 25a of the electrodes 24 and 25 extend.

Accordingly, in the display element, the electric field application direction of the electrodes 24 and 25 is identical to the rubbing direction of the alignment film 26 (they form an angle of 0°).

As described, according to the present embodiment, the display element including the substrates and the medium layer, which is held between the substrates, is further provided with on one of the substrates the electrodes 24 and 25 for applying a parallel electric field to the substrates and causing optical modulation of the medium A of the medium layer, as well as the alignment film 26 on the other substrate which is horizontally rubbed. With this arrangement, the display element achieves reduction in driving voltage. Further, since the electrodes 24 and 25 apply an electric field in a direction at 0°-45° with respect to the rubbing direction of the alignment film 26, the Kerr constant increases, thereby further reducing the driving voltage.

Further it is preferable that the electric field applying means generates an electric field toward two directions.

With the foregoing arrangement, the electrodes 4 and 5 formed on the substrate 1 are supplied with voltages from two directions. With this arrangement with two-direction voltage application, there exist two types of medium domains with different optical anisotropies (optically anisotropies with different directions). On this account, the viewing angle characteristic of the display element increases.

Further, the display element according to the present example embodiment is preferably arranged such that the electric field applying means generates an electric field toward two directions perpendicular to each other.

With this arrangement, these two paths of voltage application from the electric field applying means are orthogonal to each other, and there are two types of medium domains with two optical anisotropies whose directions are orthogonal to each other. Therefore, this display element is capable of compensating the coloring in the oblique viewing angle, because the two medium domains correct the coloring each other. With this arrangement, it is possible to provide a display element with a superior viewing angle characteristic without decreasing the transmittance.

Further, the display element according to the technology disclosed herein may be arranged such that at least one of the pair of substrates is provided with a polarizer on a substrate opposite to a substrate facing the medium. With this arrangement, birefringence is generated from the electric field applied from the electric field applying means, thereby modulating the transmittance.

Further, the display element according to the technology disclosed herein is preferably arranged such that the electric field applying means generates an electric field toward a direction at 45°, with a gain or loss of less than 10°, with respect to an absorption axis of the polarizer.

In the foregoing display element in which the electric filed in applied substantially in parallel with the substrate, the arrangement in which the electric field is applied in a direction at 45°, with a gain or loss of less than 10°, with respect to the absorption axes of the polarizers enables maximum increase in transmittance.

Further, the display element according to the present invention is preferably arranged such that the second substrate is provided with a horizontal alignment film on its surface, and the alignment film is rubbed in a direction at 0°-45° with respect to a direction toward which the electric field applying means generates an electric field.

With this arrangement in which the alignment film is rubbed in a direction at 0°-45° with respect to a direction toward which the electric field applying means generates an electric field, the orientation order in the horizontal direction of the medium increases, and the Kerr constant Bk according to the foregoing formula (3) increases (that is, the Kerr effect becomes more significant) at a temperature right above the phase transition temperature. Further, the increase of Kerr effect allows reduction of the voltage applied to the display element for driving, allowing the display element to be used as a product with less driving voltage. On the other hand, when the angle created by the electric field application directions 45c and 45d of the electrodes 4 and 5 is larger than 45° with respect to the alignment direction of the alignment film 6, the Kerr constant decreases, and the reduction in driving voltage cannot be realized.

Accordingly, with the foregoing arrangement, it is possible to realize a display element with reduction in driving voltage, that is achieved by an increase of the Kerr constant Bk.

Further, the display element according to the technology disclosed herein is preferably arranged such that the second substrate is provided with a horizontal alignment film on its surface, and the alignment film is rubbed in a direction identical to a direction toward which the electric field applying means generates an electric field.

With this arrangement, the electric field applying means applies an electric field toward one direction, and the alignment film is rubbed in a direction identical to the direction toward which the electric field applying means generates an electric field. On this account, the Kerr constant increases, thereby further reducing the driving voltage.

This arrangement is immune to a decrease in voltage due to the alignment film and an increase in voltage value for driving the display element. As well as this, this arrangement gives an effect of increasing the Kerr effect, thereby realizing a display element with further less driving voltage.

Further, the display element according to the present invention is preferably arranged such that the electric field applying means is provided on a surface of the first substrate, which surface facing the second substrates, and the electric field applying means includes at least a pair of pectination electrodes with teeth sections meshing with each other.

With this arrangement, the electric field applying means is provided on a surface of the first substrate, which surface facing the second substrates, and the electric field applying means includes at least a pair of pectination electrodes with teeth sections meshing with each other. The comb-teeth sections thus meshing with each other apply an electric field substantially in parallel with the substrates. On this account, since the pectination electrode applies an electric field to the medium in a direction substantially in parallel with the substrates, the driving voltage in decreased in the display element. The "pectination electrode" here means a type of electrode in which an electrode (the root of comb) has a teeth-electrode section in which a plurality of teeth extend along a predetermined direction of the longitudinal direction.

Further, the display element according to the technology disclosed herein is preferably arranged such that the teeth sections have a cuneatic shape.

The "cuneatic shape" means one state of comb teeth section in which each tooth is bent with a predetermined angle. The comb-teeth sections thus meshing with each other apply an electric field substantially in parallel with the substrates generates an electric field at least in two directions.

With this arrangement with two-direction voltage application, there exist two types of medium domains with different optical anisotropies (optically anisotropies with different directions) in the medium A of the medium layer 3. On this account, the viewing angle characteristic of the display element increases.

Further, the display element according to the technology disclosed herein is preferably arranged such that the cuneatic shape has a curve with an angle of 90° with a gain or loss of less than 20°.

The "angle formed by curves of the saw-like shape" refers to an angle created by the curves of the comb-teeth section. Therefore, with the foregoing arrangement in which the cuneatic shape has a curve with an angle of 90° with a gain or loss of less than 20°, that is from 70° to 110°, there exist two types of medium domains with different optical anisotropies (optically anisotropies with different directions) which are orthogonal to each other (forming an angle of 90° with a gain or loss of 20°). Therefore, this display element is capable of compensating the coloring in the oblique viewing angle, because the two medium domains correct the coloring each other. With this arrangement, it is possible to provide a display element with a superior viewing angle characteristic without decreasing the transmittance.

Further, the display element according to the technology disclosed herein is preferably arranged such that each pixel of the display element has at least two domains of the medium having two types of optical anisotropies with different directions when the electric field is applied or when no electric field is applied.

With this arrangement having two types of medium domains with different optical anisotropies (optically anisotropies with different directions) which are orthogonal to each other (forming an angle of 90° with a gain or loss of 20°) when an electric field is applied, the color change in display can be suppressed in a range of, for example, a polar angle of ±60°. Therefore, this display element is capable of compensating the coloring in the oblique viewing angle, because the two medium domains correct the coloring each other. With this arrangement, it is possible to provide a display element with a superior viewing angle characteristic without decreasing the transmittance.

Further, the display element according to the technology disclosed herein is preferably further comprises: a polarizer on a surface of at least one of the pair of substrates, which surface is opposite to a substrate facing the medium, wherein directions of the optical anisotropies in the two domains of the medium when the electric field is applied or when no electric field is applied are at 45° with a gain or loss of not more than 10°, more preferably, at 45° with a gain or loss of less than 10°, with respect to an absorption axis of the polarizer.

More specifically, the maximal transmittance when an electric field is applied or when no electric field is applied is obtained when the anisotropy direction is at an angle of 45° with respect to polarizer absorption axes which are orthogonal with each other. Therefore, the anisotropy direction is most preferably at an angle of 45° with respect to polarizer absorption axes which are orthogonal with each other; however, assume that the transmittance is 100% when an angle θ is 45°, a transmittance of 90% or more gives the maximal luminance for human eyes. That is, the maximum visible luminance for human eyes is obtained when θ=35°<θ<55°.

Accordingly, the foregoing arrangement allows significant improvement of viewing angle characteristic, without degrading the transmittance.

Further, the display element according to the technology disclosed herein is preferably arranged such that directions of the optical anisotropies in the two domains of the medium when the electric field is applied or when no electric field is applied create an angle of 90° with a gain or loss of not more than 20°, more preferably an angle of 90° with a gain or loss of less than 20°.

With this arrangement, for example, it is possible to greatly improve the viewing angle characteristic without degrading display in a range of, for example, a polar angle of ±60°, as well as suppressing a decrease in transmittance.

Particularly, with the arrangement in which directions of the optical anisotropies in the two domains of the medium when the electric field is applied or when no electric field is applied are at 45° with a gain or loss of not more than 10°, more preferably, at 45° with a gain or loss of less than 10°, with respect to an absorption axis of the polarizer, and the directions of the two optical anisotropies form an angle of 90° with a gain or loss of not more than 20°, more preferably an angle of 90° with a gain or loss of less than 20°; it is possible to sufficiently suppress the color change in display in a range of, for example, a polar angle of ±60°, thus ensuring compensation of the coloring in the oblique viewing angle, while realizing bright display with substantially maximum luminance. Consequently, it is possible to provide a display element with a further superior viewing angle characteristic without decreasing the transmittance.

Further, the display element according to the technology disclosed herein is preferably arranged such that data signal lines and scanning signal lines are provided for respective columns and rows of a plurality of pixels aligned in matrix, each of the pixels including pectination pixel electrode and a pectination counter electrode for generating an electric field in a direction parallel to the substrates so as to apply the electric field to the medium, as the pair of pectination electrodes, and the pectination pixel electrode and the pectination counter electrode each have a comb-teeth section which is bent by forming a zigzag line with angles of 90° with a gain or loss of not more than 20°, within a plane parallel to the substrates.

These arrangements more easily realize the structure in which the directions of the two optical anisotropies when an electric field is applied or when no electric field is applied form an angle of 90° with a gain or loss of not more than 20°, more preferably an angle of 90° with a gain or loss of less than 20°. Therefore, it is possible to provide a display element with a further superior viewing angle characteristic without decreasing the transmittance.

Further, the display element according to the technology disclosed herein is preferably arranged such that at least one of the plurality of data signal lines and the plurality of scanning signal lines is bent in accordance with shapes of the pixel electrode and the counter electrode, forming a zigzag line with angles of 90° with a gain or loss of not more than 20°, within a plane parallel to the substrates.

With this arrangement in which at least one of the plurality of data signal lines and the plurality of scanning signal lines is bent in accordance with shapes of the pixel electrode and the counter electrode, forming a zigzag line with angles of 90° with a gain or loss of not more than 20°, within a plane parallel to the substrates, so as to form zigzag comb-teeth sections in the pectination pixel electrode and counter electrode, it is possible to greatly reduce the non-display area generated between the pectination pixel/counter electrodes and the data/scanning signal lines, thereby enlarging display area.

Further, the display element according to the technology disclosed herein is preferably arranged such that the horizontal or vertical alignment film is an organic thin film. A particularly preferable is polyimide.

Further, the display element according to the technology disclosed herein may be arranged such that the alignment film is created by rubbing or light irradiation. With this arrangement, the molecules in the vicinity of the boundary between the material layer and the alignment film are securely aligned to a desired direction.

Further, the medium may have a condition such that it is optically isotropic when no electric field is applied, and becomes optically anisotropic when an electric field is applied. In this case, the shape of the refractive index ellipsoid is a sphere when no electric field is applied but changes into an ellipsoid when an electric field is applied. Otherwise, the medium may be optically anisotropic when no electric field is applied, and becomes optically isotropic when an electric field is applied. In this case, the shape of the refractive index ellipsoid is an ellipsoid when no electric field is applied but changes into a sphere when an electric field is applied.

In the respective embodiments above, the shape of refractive index ellipsoid changes according to whether or not an electric field is applied. That is, the display is performed by not changing the direction of the optical anisotropy but changing the degree of optical anisotropy (orientational order, refractive index). With this arrangement, the all structures above offer different display state depending on whether or not an electric field is applied. Therefore, it is possible to realize a display element with a wider range of driving temperature, a wider viewing angle characteristic, and high-speed response.

Further, the display element according to the technology disclosed herein is preferably arranged such that the medium has an orientational order (orderly structure) smaller than an optical wavelength when no electric field is applied.

When the orientational order is smaller than the optical wavelength, it is optically isotropic. Accordingly, by using a medium with an orientational order which becomes smaller than the optical wavelength when no electric field is applied, acquirement of a different display state on no electric field application can be ensured.

Further, the display element according to the technology disclosed herein is preferably arranged such that the medium has a selective wavelength range or a helical pitch of not more than 400 nm. When the medium has a helical pitch larger than 400 nm, it may express the color reflecting the helical pitch. More specifically, when the medium has a helical pitch larger than 400 nm, it selectively reflects the light of wavelength according to the helical pitch; consequently, the display element displays the color reflecting the helical pitch. This phenomenon of selectively reflecting light with the wavelength reflecting the helical pitch is called selective reflection.

On this account, it is preferable that the wavelength band of selective reflection of blue phase or the helical pitch of blue phase be in the visible range, 400 nm or less. As long as the wavelength band or the helical pitch is 400 nm or less, the color expressed is not recognizable by human eyes.

Note that, the wavelength of the selective reflection also depends on an incident angle of light onto the screw axis of the medium. On this account, when the structure of the medium is not in one dimension, that is, when the structure of the medium is a three dimensional structure (for example, the cholesteric blue phase), the incident angle of light onto the screw axis distributes. Therefore, the width of the wavelength of the selective reflection also distributes. The helical pitch of not more than 400 nm is therefore desirable.

Further, it is more preferable that the medium has a selective wavelength range or a helical pitch of not more than 380 nm. According to CIE (Commission Internationale de l'Eclairage), the wavelength of 380 nm or less can not be recognized by human eyes. Therefore, the wavelength band of the selective reflection or the helical pitch of 380 nm or less securely avoids the above color expression.

Moreover, it is further preferable that the medium has a helical pitch of not more than 253 nm. The above color relates not only to the helical pitch and the incident angle but also to the average refractive index of the dielectric material. In this case, the light of the color has a wavelength width $\Delta\lambda=P\Delta n$ and centering on the wavelength $\lambda=nP$. Here, n is the average refractive index, P is the helical pitch, and $\Delta n$ is the anisotropy of the refractive index.

$\Delta n$ differs depending on the dielectric material. For example, when the liquid crystal material is injected and sealed into the dielectric material layer 3, the average refractive index of the liquid crystal material is about 1.5, and $\Delta n$ is about 0.1. In this case, to ensure that the color expression is outside the visible range, it is required to satisfy: $\lambda=400$ nm, the helical pitch $P=400/1.5=267$ nm. Moreover, $\lambda=0.1\times 267=26.7$. More specifically, to ensure that the expressed color is not recognized by human eyes, the helical pitch of the medium should be set to 253 nm or less, which value is found by subtracting 13.4 nm (about half of 26.7 nm) from 267 nm. Moreover, it is further preferable that the medium has a helical pitch of not more than 240 nm. The above explanation refers to the formula $\lambda=nP$, where $\lambda$ is 400 nm. However, when $\lambda$ is 380 nm which is the wavelength unrecognizable by human eyes according to CIE (Commission Internationale de l'Eclairage), the helical pitch needs to be set to 240 nm or less so as to ensure that the color is outside the visible range. Specifically, in the medium with a helical pitch=240 nm, the problem of color expression does not occur.

Further, the display element according to the technology disclosed herein may be arranged such that the medium contains a liquid crystal substance.

Further, the display element according to the technology disclosed herein may be arranged such that the medium has an orderly structure having a cubic symmetry.

Further, the medium may be made of molecules that exhibit a cubic phase or smectic D phase.

Further, the medium may be a liquid crystal micro emulsion.

Further, the medium may be a lyotropic liquid crystal that exhibits a micelle phase, a reverse micelle phase, a sponge phase or a cubic phase.

Further, the medium may be a liquid crystal fine particle dispersion system that exhibits a micelle phase, a reverse micelle phase, a sponge phase or a cubic phase.

In this case, the liquid crystal fine particle may have an average diameter of not more than 0.2 μm. With the fine particles having an average particle diameter of 0.2 μm or less, stable dispersibility in the dielectric material layer is ensured. Therefore, even after a long time, the fine particles do not aggregate, and the phase does not split. Thus, it is possible to sufficiently suppress unevenness of display element due to local unevenness of the fine particles as some of them are precipitated.

Further, the content of the liquid crystal fine particles may be in a range of 0.05 wt % to 20 wt % with respect to a sum of weight of the liquid crystal fine particles and the medium. The aggregation of fine particles can be more securely prevented by adjusting the content of the liquid crystal fine particles to be in a range of 0.05 wt % to 20 wt % with respect to a sum of weight of the liquid crystal fine particles and the medium.

Further, the medium may be a dendrimer.

Further, the medium may be made of molecules that exhibit a cholesteric blue phase.

Further, the medium may be made of molecules that exhibit a smectic blue phase.

The foregoing substance examples all cause a change in degree of optical anisotropy. With such a property, the substances are all suitable for the medium.

Further, as described, the display device of the technology disclosed herein includes the display element of the present invention. Therefore, it is possible to obtain a display device with a wider driving temperature range, high-speed response, and superior viewing angle.

As has been explained, the display element of the technology disclosed herein achieves a wider driving temperature range, high-speed response, and superior viewing angle. With this characteristics, the liquid crystal display device of the technology disclosed herein can be widely used for an image display apparatus (display device) such as a television, a monitor etc., an OA (Office Automation) apparatus such as a word processor, a personal computer etc., or an image display device (display device) provided in an information terminal such as a video cassette recorder, a digital camera, or a mobile phone. Further, as described above, since the display element of the technology disclosed herein achieves high-speed response, and superior viewing angle, while reducing driving voltage that that of the conventional display. Therefore, the display element is suitable for a large-sized display, moving pictures etc.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display element, comprising:
    a pair of substrates, at least one of which is transparent;
    a medium held between the pair of substrates, a degree of optical anisotropy of the medium being optically isotropic when no electric field is applied thereon but becoming optically anisotropic when an electric field is applied thereon, or being optically anisotropic when no electric field is applied thereon but becoming optically isotropic when an electric field is applied thereon;
    electric field applying means, provided on a first substrate of the pair of substrates, for generating an electric field in a direction parallel to the substrates so as to apply the electric field to the medium; and
    a horizontal or vertical alignment film provided only on a second substrate of the pair of substrates.

2. The display element as set forth in claim 1, wherein:
    the electric field applying means generates an electric field toward at least two directions.

3. The display element as set forth in claim 1, wherein:
    at least one of the pair of substrates is provided with a polarizer on a substrate opposite to a substrate facing the medium.

4. The display element as set forth in claim 3, wherein:
    the electric field applying means generates an electric field toward a direction at 45° with a gain or loss of less than 10°, with respect to an absorption axis of the polarizer.

5. The display element as set forth in claim 1, wherein:
    the second substrate is provided with a horizontal alignment film on its surface, and the alignment film is rubbed in a direction at 0°-45° with respect to a direction toward which the electric field applying means generates an electric field.

6. The display element as set forth in claim 1, wherein:
    the second substrate is provided with a horizontal alignment film on its surface, and the alignment film is rubbed in a direction identical to a direction toward which the electric field applying means generates an electric field.

7. The display element as set forth in claim 1, wherein:
    the electric field applying means is provided on a surface of the first substrate, which surface facing the second substrates, and the electric field applying means includes at least a pair of pectination electrodes with teeth sections meshing with each other.

8. The display element as set forth in claim 7, wherein:
    the teeth sections have a cuneatic shape.

9. The display element as set forth in claim 1, wherein:
    each pixel of the display element has at least two domains of the medium having two types of optical anisotropies with different directions when the electric field is applied or when no electric field is applied.

10. The display element as set forth in claim 9, further comprising:
    a polarizer on a surface of at least one of the pair of substrates, which surface is opposite to a substrate facing the medium,
    wherein:
    directions of the optical anisotropies in the two domains of the medium when the electric field is applied or when no electric field is applied are at 45° with a gain or loss of not more than 10°, with respect to an absorption axis of the polarizer.

11. The display element as set forth in claim 9, wherein:
    directions of the optical anisotropies in the two domains of the medium when the electric field is applied or when no electric field is applied are at 45° with a gain or loss of less than 10°, with respect to an absorption axis of the polarizer.

12. The display element as set forth in claim 9, wherein:
    directions of the optical anisotropies in the two domains of the medium when the electric field is applied or when no electric field is applied create an angle of 90° with a gain or loss of not more than 20°.

13. The display element as set forth in claim 1, wherein:
    the horizontal or vertical alignment film is an organic thin film.

14. The display element as set forth in claim 1, wherein:
    the horizontal or vertical alignment film is made of polyimide.

15. The display element as set forth in claim 1, wherein:
    the horizontal or vertical alignment film is created by rubbing or light irradiation.

16. The display element as set forth in claim 1, wherein:
    the medium has an orientational order smaller than an optical wavelength when no electric field is applied.

17. The display element as set forth in claim 1, wherein:
    the medium has a selective wavelength range or a helical pitch of equal to or less than 400 nm.

18. The display element as set forth in claim 1, wherein:
    the medium contains a liquid crystal substance.

19. The display element as set forth in claim 1, wherein:
    the medium has an orderly structure having a cubic symmetry.

20. The display element as set forth in claim 1, wherein:
    the medium is made of molecules that exhibit a cubic phase or smectic D phase.

21. The display element as set forth in claim 1, wherein:
    the medium is a liquid crystal micro emulsion.

22. The display element as set forth in claim 1, wherein:
    the medium is a lyotropic liquid crystal that exhibits a micelle phase, a reverse micelle phase, a sponge phase or a cubic phase.

23. The display element as set forth in claim 1, wherein:
    the medium is a liquid crystal fine particle dispersion system that exhibits a micelle phase, a reverse micelle phase, a sponge phase or a cubic phase.

24. The display element as set forth in claim 23, wherein:
the liquid crystal fine particle has an average diameter of not more than 0.2 μm.

25. The display element as set forth in claim 23, wherein:
a content of the liquid crystal fine particles is in a range of 0.05 wt % to 20 wt % with respect to a sum of weight of the liquid crystal fine particles and the medium.

26. The display element as set forth in claim 1, wherein:
the medium is a dendrimer.

27. The display element as set forth in claim 1, wherein:
the medium is made of molecules that exhibit a cholesteric blue phase.

28. The display element as set forth in claim 1, wherein:
the medium is made of molecules that exhibit a smectic blue phase.

29. A display device comprising the display element as set forth in claim 1.

30. A display element, comprising:
a pair of substrates, at least one of which is transparent;
a medium held between the pair of substrates, a degree of optical anisotropy of the medium being optically isotropic when no electric field is applied thereon but becoming optically anisotropic when an electric field is applied thereon, or being optically anisotropic when no electric field is applied thereon but becoming optically isotropic when an electric field is applied thereon;
electric field applying means, provided on a first substrate of the pair of substrates, for generating an electric field in a direction parallel to the substrates so as to apply the electric field to the medium; and
a horizontal or vertical alignment film provided on a second substrate of the pair of substrates;
wherein:
the electric field applying means generates an electric field toward at least two directions; and
the electric field applying means generates an electric field toward two directions perpendicular to each other.

31. A display element, comprising:
a pair of substrates, at least one of which is transparent;
a medium held between the pair of substrates, a degree of optical anisotropy of the medium being optically isotropic when no electric field is applied thereon but becoming optically anisotropic when an electric field is applied thereon, or being optically anisotropic when no electric field is applied thereon but becoming optically isotropic when an electric field is applied thereon;
electric field applying means, provided on a first substrate of the pair of substrates, for generating an electric field in a direction parallel to the substrates so as to apply the electric field to the medium; and
a horizontal or vertical alignment film provided on a second substrate of the pair of substrates;
wherein:
the electric field applying means is provided on a surface of the first substrate, which surface facing the second substrates, and the electric field applying means includes at least a pair of pectination electrodes with teeth sections meshing with each other;
the teeth sections have a cuneatic shape; and
the cuneatic shape has a curve with an angle of 90° with a gain or loss of less than 20°.

32. A display element, comprising:
a pair of substrates, at least one of which is transparent;
a medium held between the pair of substrates, a degree of optical anisotropy of the medium being optically isotropic when no electric field is applied thereon but becoming optically anisotropic when an electric field is applied thereon, or being optically anisotropic when no electric field is applied thereon but becoming optically isotropic when an electric field is applied thereon;
electric field applying means, provided on a first substrate of the pair of substrates, for generating an electric field in a direction parallel to the substrates so as to apply the electric field to the medium; and
a horizontal or vertical alignment film provided on a second substrate of the pair of substrates;
wherein:
the electric field applying means is provided on a surface of the first substrate, which surface facing the second substrates, and the electric field applying means includes at least a pair of pectination electrodes with teeth sections meshing with each other;
data signal lines and scanning signal lines are provided for respective columns and rows of a plurality of pixels aligned in matrix, each of the pixels including pectination pixel electrode and a pectination counter electrode for generating an electric field in a direction parallel to the substrates so as to apply the electric field to the medium, as the pair of pectination electrodes, and
the pectination pixel electrode and the pectination counter electrode each have a comb-teeth section which is bent by forming a zigzag line with angles of 90° with a gain or loss of not more than 20°, within a plane parallel to the substrates.

33. The display element as set forth in claim 32, wherein:
at least one of the plurality of data signal lines and the plurality of scanning signal lines is bent in accordance with shapes of the pixel electrode and the counter electrode, forming a zigzag line with angles of 90° with a gain or loss of not more than 20°, within a plane parallel to the substrates.

* * * * *